US008393725B2

(12) United States Patent
Irita

(10) Patent No.: US 8,393,725 B2
(45) Date of Patent: Mar. 12, 2013

(54) INK SET AND IMAGE FORMING METHOD

(75) Inventor: Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 202 days.

(21) Appl. No.: 12/859,271

(22) Filed: Aug. 19, 2010

(65) Prior Publication Data

US 2011/0050789 A1    Mar. 3, 2011

(30) Foreign Application Priority Data

Aug. 28, 2009   (JP) .................................. 2009-198497

(51) Int. Cl.
*C09D 11/00*   (2006.01)

(52) U.S. Cl. .............. 347/96; 347/95; 347/98; 347/100; 347/102

(58) Field of Classification Search ............ 347/95–102; 106/31.13, 31.6; 523/160, 161
See application file for complete search history.

(56) References Cited

U.S. PATENT DOCUMENTS

| 6,232,369 | B1 * | 5/2001 | Ma et al. ....................... 523/161 |
| 6,428,862 | B1 * | 8/2002 | Noguchi ....................... 427/511 |
| 2007/0046715 | A1 * | 3/2007 | Yamanobe et al. ............. 347/19 |
| 2009/0079784 | A1 * | 3/2009 | Chiwata et al. ................. 347/21 |
| 2009/0130312 | A1 * | 5/2009 | Ono et al. ..................... 427/288 |
| 2009/0163646 | A1 * | 6/2009 | Kato et al. .................... 524/560 |

FOREIGN PATENT DOCUMENTS

| JP | 3069543 B | 7/2000 |
| JP | 3206797 B | 9/2001 |
| JP | 3217486 B | 10/2001 |
| JP | 3576862 B | 10/2004 |
| JP | 3642152 B | 4/2005 |

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

The present invention provides an ink set including: an ink composition including a pigment, polymer particles having an ethylene oxide chain in a side chain of the polymer, and a water-soluble polymerizable compound that has an ethylene oxide chain and that is polymerized by active energy rays; and a treating liquid including an aggregating agent that aggregates ingredients in the ink composition.

13 Claims, 1 Drawing Sheet

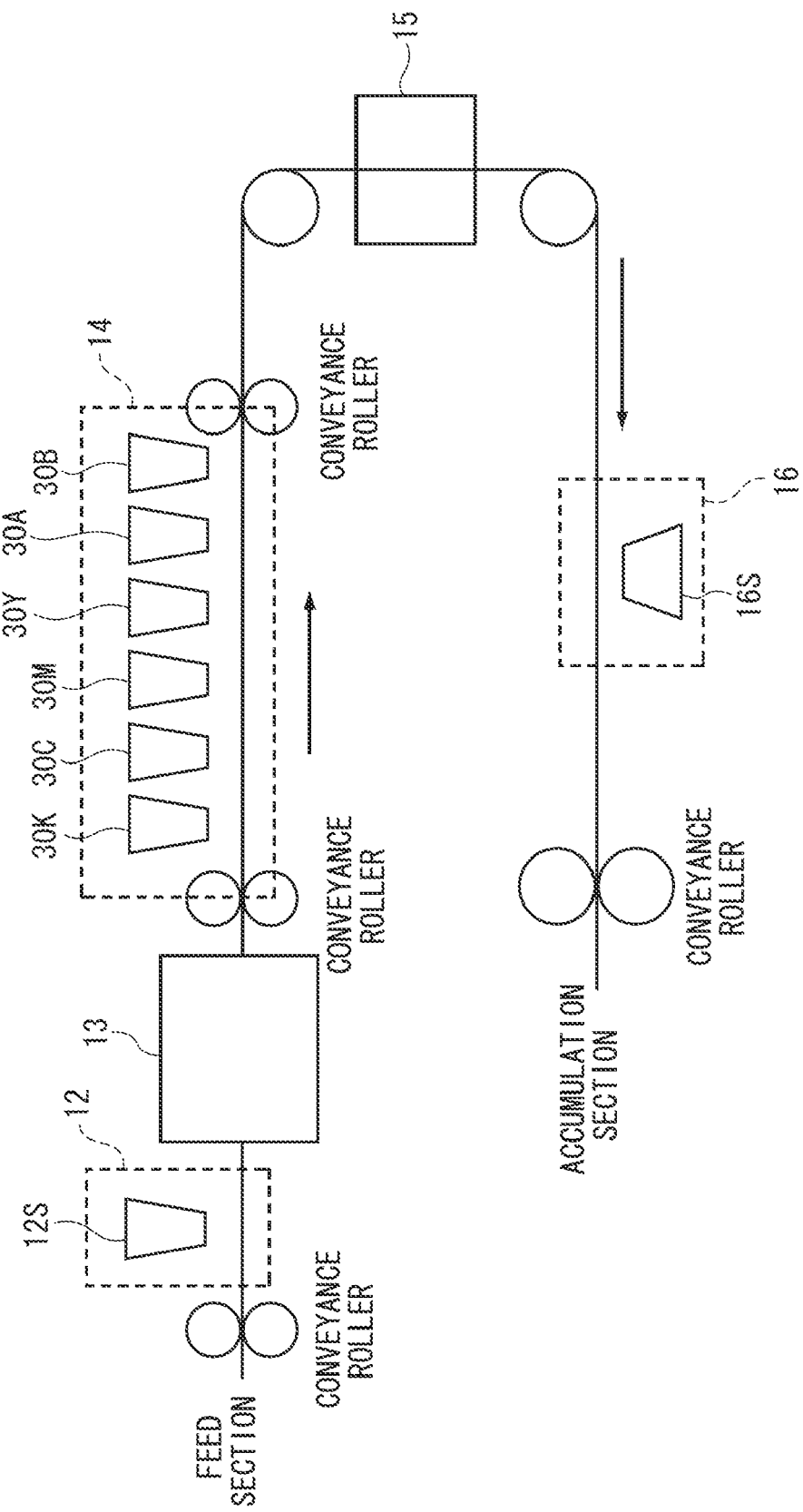

INK SET AND IMAGE FORMING METHOD

CROSS-REFERENCE TO RELATED APPLICATION

This application claims priority under 35 USC 119 from Japanese Patent Application No. 2009-198497, filed on Aug. 28, 2009, the disclosure of which is incorporated by reference herein.

BACKGROUND OF THE INVENTION

1. Field of the Invention

The present invention relates to an ink set suitable for recording an image by jetting an ink according to an inkjet method, and an image forming method using the same.

2. Description of the Related Art

Various methods have recently been proposed as image recording methods for recording color images. In each method, desired quality of prints is high, including image quality, texture, and post-recording curl.

For example, inkjet techniques have been applied to office printers, home printers, and the like, and have recently been begun to be applied to commercial printing. In commercial printing, printed sheets are required to have a texture similar to that of general printing paper, rather than a surface, such as that of a photograph, that completely blocks penetration of ink solvent into base paper. However, the range of properties such as surface gloss, texture and stiffness is limited when a recording medium has a solvent absorption layer with a thickness as large as from 20 μm to 30 μm. Therefore, application of inkjet techniques in commercial printing has been limited, for example, to posters and vouchers, with respect to which the restrictions on surface gloss, texture, stiffness and the like are tolerable.

Recording media exclusively for inkjet recording have high production costs due to incorporation of solvent-absorbing layers and water-proof layers, which is one of the factors that limit application of inkjet techniques to commercial printing.

A pigment is widely used as a colorant that is one of the components contained in an ink material. When used, the pigment is dispersed in a medium such as water. When the pigment is dispersed and used, the diameter, post-dispersing stability, and size uniformity of the dispersed particles, jettability from jetting heads, and the like are important. Techniques that improve such properties are widely being studied.

There are cases in which pigment-containing inks do not have satisfactory properties in terms of fixability (for example, resistance to rubbing), water resistance, and stain resistance since such inks generally remain on a surface of a recording medium rather than penetrating into the recording medium.

With a view to providing a pigment-containing ink with excellent water resistance and stain resistance, an inkjet ink composition containing self-dispersing polymer particles has been disclosed (see, for example, Japanese Patent No. 3,069,543).

As a method for providing a pigment-containing ink with excellent resistance to rubbing and water, a method in which a polar polymer containing solution together with the pigment-containing ink is applied onto a recording medium has been disclosed (see, for example, Japanese Patent No. 3,217,486). Another method has also been disclosed in, for example, Japanese Patent No. 3,206,797; in this method, a reaction liquid that reacts with an ink composition, such as a liquid containing a polyvalent metal salt or a polyallylamine, and an ink containing a pigment and a thermoplastic resin emulsion are used to form an image, which is then fixed at a temperature that is not lower than the softening temperature of the thermoplastic resin.

However, satisfactory properties may not be obtained in the method of containing self-dispersing polymer particles, the method of applying a solution containing a polar polymer onto a recording medium, and the method of fixing a thermoplastic resin latex containing ink at a temperature not lower than the softening point of the thermoplastic resin. This is because, although the thus-contained polymer or resin functions as a binder and improves fixability, water resistance, and the like, the fixability is influenced by thermal properties of the polymer. In particular, when inkjet recording is performed at high speed, the tendency to unsatisfactory properties is conspicuous since sufficient thermal fixing may not be achieved. In such a case, fixing properties can be improved by lowering the softening temperature of the polymer; however, the lowered softening temperature also results in adhesion phenomenon (blocking) of an image surface in a high-temperature environment, and it is difficult to achieve both of improvement in fixability and suppression of the blocking.

The degradation of fixability of the aqueous pigment ink is also affected by the properties of printed sheets. For example, tendency for a pigment to remain on the paper surface is greater and high-speed recording of high-quality images is not possible when the paper is common printing paper used for usual offset printing, which have liquid infiltration property inferior to that of plain paper.

In this relation, a technique of using an ink in which a polymerizable monomer and a pigment are used in combination and curing the ink with UV rays (UV inkjet) is widely known and commonly used. The UV inkjet achieves excellent resistance to rubbing. However, the ink used for the UV inkjet is generally a solvent-based ink, which is environmentally unfavorable, and, when pre-curing ink droplets contact each other, the ink droplets coalesce (spotting interference). Therefore, the UV inkjet is unsuitable for high-speed recording.

Regarding aqueous pigment inks, which are environmentally favorable, a method of improving rubbing resistance by including a polymerizable monomer in an aqueous pigment ink and curing the same is being studied. For example, an inkjet recording method has been disclosed (see, for example, Japanese Patent No. 3,642,152) in which printing is performed on a recording medium by depositing (i) a reaction liquid containing a photopolymerization initiator and a reactive agent that causes coagulation when contacting with an ink composition and (ii) an ink composition containing an acrylate monomer and/or a resin emulsion. Further, an ink of one-component type used for inkjet recording is disclosed (see, for example, Japanese Patent No. 3,576,862) which includes a specific cationic oligomer and a photopolymerization initiator, together with a colorant and water.

However, according to the method disclosed in Japanese Patent No. 3,642,152, the ink is an aqueous pigment ink in which an aqueous medium is used for the ink, but the solubility of a monomer is not taken into consideration and problems that are caused when a water-soluble monomer is added have not been avoided. Such an ink composition has problems in that the monomer and the pigment are separated from each other, and resultantly a sufficient rubbing resistance of the image is difficult to be achieved, and further blocking properties of the image are poor, and when time has passed in a state where image surfaces are in contact with each other, the images are locally stuck to each other and do not separate. The method includes a reaction between a reaction liquid and an ink to fix the ink. However, since the monomer tends to separate, an immobilization reaction is also insufficient.

In the method disclosed in Japanese Patent No. 3,576,862, the ink includes a specific polymerizable monomer (oligomer) having sufficient water-solubility, thus achieving a condition in which the pigment and the monomer does not readily separate and the rubbing resistance can be readily improved. However, components in the ink before curing have a tendency to coalesce, and the ink is unsuitable for high-speed recording. Regarding this issue, when immobilization of pre-curing ink is attempted using a two-component reaction system as disclosed in Japanese Patent No. 3,642,152, it is difficult to perform sufficient immobilization reaction due to high solubility of the monomer.

When ink droplets are spotted on permeable paper using this method, the pigment remains on the paper surface while the monomer penetrates into the paper, thereby resulting in insufficient rubbing resistance in some cases.

SUMMARY OF THE INVENTION

The present invention has been made in view of the above.

A first aspect of the present invention provides an ink set including: an ink composition containing a pigment, polymer particles including a polymer having an ethylene oxide chain $[(C_2H_4O)_n]$ chain (n represents a positive integer; hereinafter also referred to as an EO chain, which applies below), a structural unit derived from polyethylene glycol] in the side chain of the polymer, and a water-soluble polymerizable compound having an ethylene oxide chain $[(C_2H_4O)_n$ chain (n=positive integer); EO chain] and capable of being polymerized by active energy rays; and a treating liquid containing a coagulant that coagulates ingredients in the ink composition.

BRIEF DESCRIPTION OF THE DRAWINGS

FIG. 1 is a schematic configuration diagram showing an example of the structure of an inkjet recording device for use in carrying out an image forming method of the present invention.

DETAILED DESCRIPTION OF THE INVENTION

Figure 17:
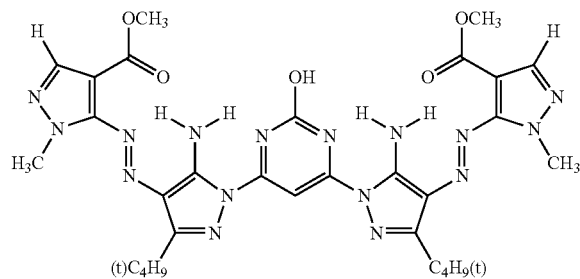
Figure 18:
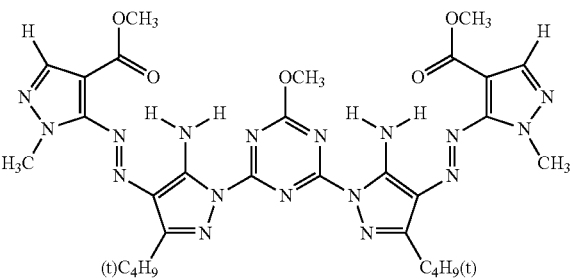
Figure 19:
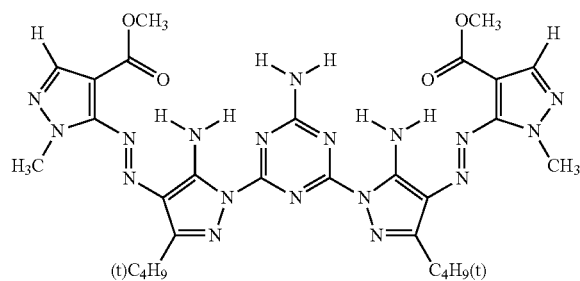
Figure 20:
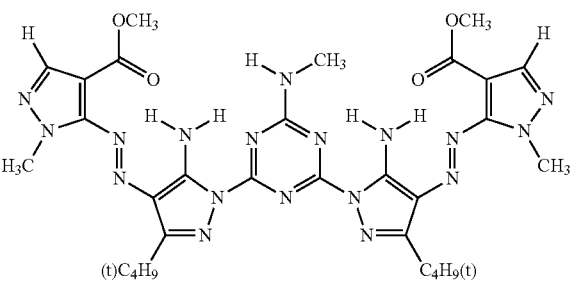
Figure 21:
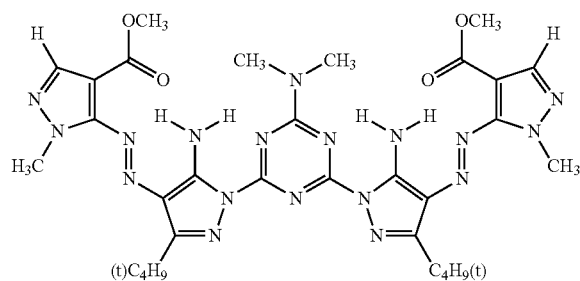
Figure 22:
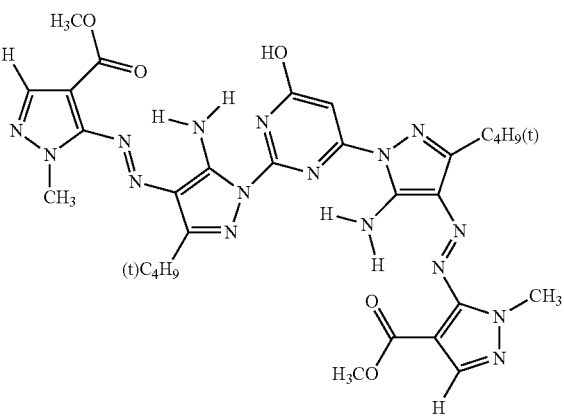
Figure 23:
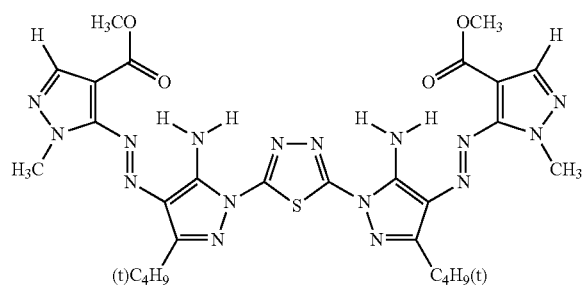
Figure 24:
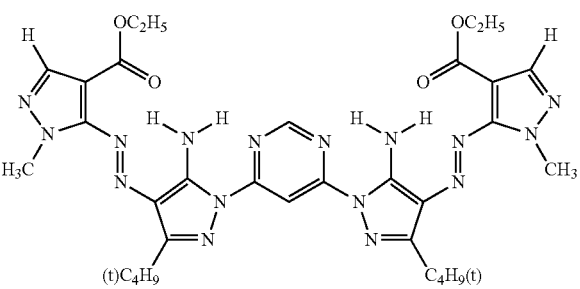

The present invention can provide an ink set and an image forming method capable of forming images that are immobilized (fixed) to a recording medium to achieve excellent rubbing resistance and have a uniform image surface with excellent glossiness.

<Ink Set>

The ink set of the present invention is configured to include an ink composition and a treatment liquid; the ink composition including a pigment, polymer particles including a polymer having an ethylene oxide chain (EO chain) in a side chain of the polymer, and a water-soluble polymerizable compound having an ethylene oxide chain (EO chain) and capable of being polymerized by an active energy radiation; and the treatment liquid including a coagulant that coagulates ingredients in the ink composition.

In the present invention, the ink composition, which will form an ink image, includes polymer particles and a water-soluble polymerizable compound that can be cured through polymerization, together with a pigment. Due to this configuration, an image is immobilized by a coagulation reaction of the pigment and/or the polymer particles when the ink composition contacts the treatment liquid. Further, the polymer particles are present between particles of the pigment, and the polymerizable compound, which is in the state of being incorporated into a space among such particles in the immobilized image, is cured through polymerization, whereby image strength is increased. In other words, components in the ink composition are coagulated rapidly to prevent intermixing of ink droplets, and, as a result, suitability for high-speed recording and effects in improving the hue and image printing properties during high-speed recording are imparted, while the polymerizable compound enters, to an appropriate extent, into a space among the pigment particles and the polymer particles that are in a coagulated state. In this state, the polymerizable compound enters into the space to a higher extent than the extent to which the polymerizable compound enters into a space between the pigment particles when the polymer particles are absent. Since the polymerizable compound is polymerized and cured in this state, the image strength can be improved, and suitability for high-speed recording and improvement in the rubbing resistance of an image can be both achieved.

In the present invention, the polymer particles and the polymerizable compound further have the ethylene oxide chain $[(C_2H_4O)_n$ chain (n represents a positive integer)] which is a structural unit derived from polyethylene glycol, and thus the surface state of images to be formed is prevented from becoming nonuniform, and a highly-uniform image surface is obtained. Therefore, images showing excellent gloss in the image portion (e.g., a region having a relatively large amount of ink such as a solid image or the like) can be formed.

In particular, the invention is more effective for the case where image recording is carried out on a coated paper in which pigments are likely to remain on the surface of a recording medium.

The polymer particles are preferably self-dispersing polymer particles. When the self-dispersing polymer particles are used, color and image printing properties at the time of high-speed recording are further improved, and the reason thereof is considered as follows.

In general, polymer particles, such as latex, are usually synthesized by, for example, emulsion polymerization using an emulsifying agent. During the synthesis, not the whole of the emulsifying agent is adsorbed to the polymer particles, and some portion of the emulsifying agent is present in the liquid while maintaining an equilibrium between adsorption and liberation; in other words, the free emulsifying agent is present as an extra component that inhibits coagulation, so that the coagulation properties observed when coagulation components in the treatment liquid contact the ink tend to be decreased. In the present invention, when a soap-free self-dispersing polymer is used as a component of the ink composition, the coagulation components directly work so that the coagulation reaction easily occurs, and quicker coagulation of ink composition components is enabled. Thus, bleeding and intercolor mixing caused by interference between ink droplets are prevented more effectively, and an image having improved color and image printing properties (such as reproducibility of thin lines and minute portions in the image) is obtained at higher speed than that of the conventional techniques.

Ink Composition

An ink composition in the present invention includes a pigment, polymer particles, having an ethylene oxide chain in a side chain of the polymer, and a water-soluble polymerizable compound having an ethylene oxide chain and capable of being polymerized by an active energy radiation. The ink composition may further contain a dispersant, a surfactant, and other components, as necessary.

Pigment

The ink composition in the present invention includes at least one pigment as a colorant component. The pigment is not particularly limited, and may be selected appropriately according to the purpose. For example, the pigment may be an organic pigment or an inorganic pigment. The pigment is preferably almost completely insoluble in water or hardly-soluble in water, in consideration of ink coloring properties.

Examples of the organic pigment include azo pigments, polycyclic pigments, dye chelates, nitro pigments, nitroso pigments, and aniline black. Among these, azo pigments and polycyclic pigments are preferable.

Examples of the inorganic pigment include titanium oxide, iron oxide, calcium carbonate, barium sulfate, aluminum hydroxide, barium yellow, cadmium red, chromium yellow, and carbon black. Among these, carbon black is especially preferable.

Examples of organic pigments for orange or yellow include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180 and C. I. Pigment Yellow 185.

Organic pigments having a magenta or red color include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 222 and C. I. Pigment Violet 19.

Examples of organic pigments for green or cyan include C. I. Pigment Blue 15, C. I. Pigment Blue 15:2, C. I. Pigment Blue 15:3, C. I. Pigment Blue 15:4, C. I. Pigment Blue 16, C. I. Pigment Blue 60 and C. I. Pigment Green 7, and aluminum phthalocyanine pigments crosslinked with siloxane such as those described in U.S. Pat. No. 4,311,775.

Examples of organic pigments for black include C. I. Pigment Black 1, C. I. Pigment Black 6 and C. I. Pigment Black 7.

Preferable examples of the azo pigments include pigments represented by Formula (1) and tautomers thereof. Hereinafter, the azo pigments represented by Formula (1) will be described.

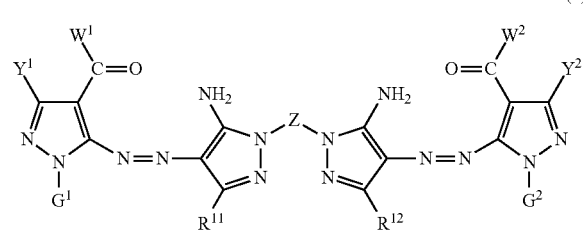

(1)

The compounds represented by Formula (1) are likely to form an intermolecular interaction due to the specific structure, and has low solubility with respect to water or organic solvents, whereby the compounds can be used as azo pigments.

Unlike dyes that are dissolved in water, organic solvents, or the like in a molecular dispersion state for use, the above azo pigments are finely dispersed in a solvent as solid particles, such as an aggregate of molecules, for use.

In Formula (1), Z represents a divalent group derived from a 5 to 8 membered nitrogen-containing heterocyclic ring, $Y^1$, $Y^2$, $R^{11}$, and $R^{12}$ each independently represent a hydrogen atom or a substituent, $G^1$ and $G^2$ each independently represent a hydrogen atom, an alkyl group, a cycloalkyl group, an aralkyl group, an alkenyl group, an alkynyl group, an aryl group, or a heterocyclic group, and $W^1$ and $W^2$ each independently represent an alkoxy group, an amino group, an alkyl group, or an aryl group.

In Formula (1), Z represents a divalent group derived from a 5 to 8 membered nitrogen-containing heterocyclic ring. Examples of a preferable nitrogen-containing heterocyclic ring without limiting the substitution position include a pyrrole ring, a pyrazole ring, a triazole ring, an imidazole ring, a thiazole ring, an isothiazole ring, an oxazole ring, an isooxazole ring, a thiadiazole ring, a thiophen ring, a furan ring, a pyridine ring, a pyrimidine ring, a triazine ring, and a pyridazine ring. The nitrogen-containing heterocyclic ring is more preferably a 6-membered nitrogen-containing heterocyclic ring, and examples include a pyridine ring, a pyrimidine ring, and an s-triazine ring. Z is particularly preferably a divalent group derived from the pyrimidine ring.

Z is preferably a 6 membered nitrogen-containing heterocyclic ring because the intramolecular action or intermolecular action of dye molecule is easy to be increased also due to hydrogen bonding properties and molecule flatness.

The divalent group derived from the 5 to 8 membered nitrogen-containing heterocyclic ring may be further fused.

When $Y^1$ and $Y^2$ represent a substituent, examples of the substituent include a halogen atom and an alkyl group (which is a straight-chain, branched-chain, or cyclic substituted or unsubstituted alkyl group and also includes a cycloalkyl group, a bicycloalkyl group, and a tricyclo structure having many ring structures; The alkyl group in substituents described below (e.g., an alkyl group in an alkoxy group, an alkyl carbonyl group, or an alkyl sulfonyl group) also represents the alkyl group having such a concept.), an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl or arylsulfonyl amino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

$Y^1$ and $Y^2$ are particularly preferably a hydrogen atom, an alkyl group (e.g., a methyl group), an aryl group (e.g., a phenyl group), a heterocyclic group (e.g., a 2-pyridyl group), and an alkylthio group (e.g., a methylthio group) and still more preferably a hydrogen atom, a methyl group, a phenyl group, and a methylthio group. Among the above, a hydrogen atom is most preferable. $Y^1$ and $Y^2$ may be the same or different.

In Formula (1), $R^{11}$ and $R^{12}$ represent a hydrogen atom or a substituent. When $R^{11}$ and $R^{12}$ represent a substituent, examples of the substituent include a straight or branched chain alkyl group having 1 to 12 carbon atoms (e.g., methyl, ethyl, n-propyl, i-propyl, n-butyl, i-butyl, sec-butyl, t-butyl, 2-ethylhexyl, 2-methyl sulfonyl ethyl, 3-phenoxy propyl, and trifluoro methyl), a straight or branched chain aralkyl group having 7 to 18 carbon atoms (e.g., benzyl), a straight or branched chain alkenyl group having 2 to 12 carbon atoms (e.g., vinyl), a straight or branched chain alkynyl group (e.g., ethinyl), a straight or branched chain cycloalkyl group of having 3 to 12 carbon atoms (e.g., cyclopentyl), a straight or branched chain cycloalkenyl group having 3 to 12 carbon atoms (e.g., cyclopentenyl), halogen atoms (e.g., chlorine and bromine), an aryl group (e.g., phenyl, 4-t-butylphenyl, and 2,4-di-t-amylphenyl), a heterocyclic group (e.g., imidazolyl, pyrazolyl, triazolyl, 2-furyl, 2-thienyl, 2-pyrimidinyl, and 2-benzothiazolyl), a cyano group, a hydroxyl group, a nitro group, a carboxyl group, an amino group, an alkyloxy group (e.g., methoxy, ethoxy, 2-methoxy ethoxy, and 2-methyl sulfonyl ethoxy), an aryloxy group (e.g., phenoxy, 2-methylphenoxy, 4-t-butylphenoxy, 3-nitrophenoxy, 3-t-butyloxy carbonyl phenoxy, 3-methoxy carbonyl phenyloxy, an acyl amino group (e.g., acetamide, benzamide, and 4-(3-t-butyl 4-hydroxy phenoxy) butane amide), an alkylamino group (e.g., methylamino, butylamino, diethylamino, and methylbutylamino), an arylamino group (e.g., phenylamino and 2-chloroanilino), a ureido group (e.g., phenylureido, methylureido, and N,N-dibutylureido), a sulfamoyl amino group (e.g., N,N-dipropyl sulfamoyl amino), an alkylthio group (e.g., methylthio, oethylthio, and 2-phenoxyethylthio), an arylthio group (e.g., pheylthio, 2-butoxy-5-t-octylpheylthio, and 2-carboxypheylthio), an alkyloxy carbonyl amino group (e.g., methoxy carbonyl amino), an alkylsulfonylamino group and an arylsulfonylamino group (e.g., methylsulfonylamino, phenylslufonylamino, and p-toluenesulfonylamino), a carbamoyl group (e.g., N-ethyl carbamoyl and N,N-dibutylcarbamoyl), a sulfamoyl group (e.g., N-ethylsulfamoyl, N,N-dipropylsulfamoyl, and N-phenylsulfamoyl), a sulfonyl group (e.g., methylsulfonyl, octylsulfonyl, phenylslufonyl, and p-toluenesulfonyl), an alkyloxycarbonyl group (e.g., methoxycarbonyl and butyloxycarbonyl), a heterocyclic oxy group (e.g., a 1-phenyl tetrazol-5-oxy and 2-tetrahydropyranyloxy), an azo group (e.g., phenylazo, 4-methoxyphenylazo, 4-pivaloylaminophenylazo, and 2-hydroxy-4-propanoylphenylazo), an acyloxy group (e.g., acetoxy), a carbamoyloxy group (e.g., N-methylcarbamoyloxy and N-phenylcarbamoyloxy), a silyloxy group (e.g., trimethylsilyloxy and dibutylmethylsilyloxy), an aryloxycarbonylamino group (e.g., phenoxycarbonylamino), an imido group (e.g., N-succinimido and N-phthalimido), a heterocyclic thio group (e.g., 2-benzothiazolylthio, 2,4-di-phenoxy-1,3,5-triazole-6-thio, and 2-pyridylthio), a sulfinyl group (e.g., 3-phenoxypropylsulfinyl), a phosphonyl group (e.g., phenoxyphosphonyl, octyloxyphosphonyl, and phenylphosphonyl), an aryloxycarbonyl group (e.g., phenoxycarbonyl), an acyl group (e.g., acetyl, 3-phenylpropanoyl, and benzoyl), and an ionic hydrophilic group (e.g., a carboxyl group, a sulfo group, a phosphono group, and a quaternary ammonium group).

In Formula (1), $R^{11}$ and $R^{12}$ each are preferably a substituted or unsubstituted acylamino group having a total number of carbon atoms of 1 to 8, a substituted or unsubstituted alkyl group having a total number of carbon atoms of 1 to 12, a substituted or unsubstituted aryl group having a total number of carbon atoms of 6 to 18, or a substituted or unsubstituted heterocyclic group having a total number of carbon atoms of 4 to 12, more preferably a straight chain alkyl group or a branched chain alkyl group having a total number of carbon atoms of 1 to 8, still more preferably a methyl group or a t-butyl group, and most preferably a t-butyl group among the above.

By using a straight chain alkyl group or a branched chain alkyl group having a small total number of carbon atoms (e.g., number of carbon atoms of 1 to 4) for $R^{11}$ and $R^{12}$, more excellent hue, coloring strength, and image fastness can be achieved.

$R^{11}$ and $R^{12}$ may be the same or different.

$G^1$ and $G^2$ represent a hydrogen atom, an alkyl group, a cycloalkyl group, an aralkyl group, an alkenyl group, an alkynyl group, an aryl group, or a heterocyclic group, particularly preferably a hydrogen atom, a methyl group, an ethyl group, an n-propyl group, an i-propyl group, a t-butyl group, a cyclopropyl group, a benzyl group, a 2-phenethyl group, a vinyl group, an allyl group, an ethynyl group, a propargyl group, a phenyl group, a p-tolyl group, a naphthyl group, a pyridyl group, a pyrimidinyl group, and a pyrazinyl group, and still more preferably a hydrogen atom, a methyl group, a phenyl group, a pyridyl group, a pyrimidinyl group, and a pyrazinyl group. Among the above, a methyl group, 2-pyridyl group, 2,6-pyrimidinyl group, and 2,5-pyrazinyl group are preferable.

When $G^1$ and $G^2$ represent an alkyl group, an alkyl group having a total number of carbon atoms of 5 or lower is preferable, an alkyl group having a total number of carbon atoms of 3 or lower is more preferable, and a methyl group is the most preferable. $G^1$ and $G^2$ may be the same or different.

In Formula (1), $W^1$ and $W^2$ represent an alkoxy group, an amino group, an alkyl group, or an aryl group.

The alkoxy group represented by $W^1$ and $W^2$ is preferably a substituted or unsubstituted alkoxy group having 1 to 30 carbon atoms and particularly preferably a substituted or unsubstituted alkoxy group of having 1 to 5 carbon atoms. Examples include a methoxy group, an ethoxy group, an i-propoxy group, a t-butoxy group, an n-octyloxy group, and a 2-methoxy ethoxy group.

Examples of the amino group represented by $W^1$ and $W^2$ include an alkylamino group, an arylamino group, and a heterocyclic amino group. Preferable examples include an amino group, a substituted or unsubstituted alkylamino group having 1 to 30 carbon atoms, and a substituted or unsubstituted anilino group having 6 to 30 carbon atoms. Among the above, an amino group, a substituted or unsubstituted alkylamino group having 1 to 8 carbon atoms, and a substituted or unsubstituted anilino group having 6 to 18 carbon atoms are preferable and an amino group, a substituted or unsubstituted alkylamino group having 1 to 4 carbon atoms, and a substituted or unsubstituted anilino group having 6 to 12 carbon atoms are more preferable. Examples of the amino group include an amino group (—$NH_2$), a methylamino group (—$NHCH_3$), a dimethylamino group {—$N(CH_3)_2$}, an anilino group (—NHPh), an N-methylanilino group {—N($CH_3$)Ph}, and a diphenylamino group {—$N(Ph)_2$}.

Examples of the alkyl group represented by $W^1$ and $W^2$ each independently include a straight chain, branched chain, or cyclic substituted or unsubstituted alkyl group and also includes a cycloalkyl group, a bicycloalkyl group, and a tricyclo structure having a large number of ring structures.

Specific preferable examples of the alkyl group include an alkyl group having 1 to 30 carbon atoms, such as a methyl group, an ethyl group, an n-propyl group, an i-propyl group, a t-butyl group, an n-octyl group, an eicosyl group, a 2-chloroethyl group, a 2-cyanoethyl group, and a 2-ethylhexyl group. Preferable examples of the cycloalkyl group include a substituted or unsubstituted cycloalkyl group having 3 to 30 carbon atoms, such as a cyclohexyl group, a cyclopentyl group, and a 4-n-dodecylcyclohexyl group. Specific examples of the bicycloalkyl group include a substituted or unsubstituted bicycloalkyl group having 5 to 30 carbon atoms, i.e., a monovalent group in which one hydrogen atom is removed from bicycloalkane having 5 to 30 carbon atoms, such as a bicyclo[1.2.2]heptane-2-yl group and a bicyclo[2.2.2]octane-3-yl group.

Preferable examples of the aryl group represented by $W^1$ and $W^2$ include a substituted or unsubstituted aryl group having 6 to 30 carbon atoms. Among the above, a substituted or unsubstituted aryl group having 6 to 18 carbon atoms is preferable and a substituted or unsubstituted aryl group having 6 to 12 carbon atoms is more preferable. Examples of the aryl group include a phenyl group, a p-tolyl group, a naphthyl group, an m-chlorophenyl group, and an o-hexadecanoylaminophenyl group.

Among the above, $W^1$ and $W^2$ each are preferably an alkoxy group (e.g., a methoxy group, an ethoxy group, an i-propoxy group, and a t-butoxy group), an amino group (e.g., a —$NH_2$ group, a methylamino group, a dimethylamino group, and an anilino group), an alkyl group (e.g., a methyl group, an ethyl group, an n-propyl group, an i-propyl group, a t-butyl group, and a cyclopropyl group), or an aryl group (e.g., a phenyl group, a p-tolyl group, and a naphthyl group). Among the above, an alkoxy group, an amino group, a phenyl group, or an alkyl group is preferable and an alkoxy group and an amino group are more preferable.

$W^1$ and $W^2$ each are more preferably an alkoxy group having a total number of carbon atoms of 5 or lower, an amino group (a —$NH_2$ group), and an alkylamino group having a total number of carbon atoms of 5 or lower. The embodiments that $W^1$ and $W^2$ each independently represent an alkoxy group having a total number of carbon atoms of 5 or lower, an amino group, and an alkylamino group having a total number of carbon atoms of 5 or lower are preferable in that dye molecules are easy to form rigidly a hydrogen bond at least one of in a molecule or between molecules and an excellent hue and a high fastness (e.g., light fastness, gas resistance, heat resistance, water resistance, and chemical resistance) are achieved.

In terms of hue, light fastness, and solvent resistance, an alkoxy group having a total number of carbon atoms of 3 or lower, an amino group (a —$NH_2$ group), and an alkylamino group having a total number of carbon atoms of 3 or lower are particularly preferable. Among the above, a methoxy group (a —$OCH_3$ group) or an ethoxy group (a —$OC_2H_5$ group) is preferable and a methoxy group is particularly preferable from the viewpoint of excellent hue and improvement of light fastness.

$W^1$ and $W^2$ may be the same or different.

In the present invention, when $Z, Y^1, Y^2, R^{11}, R^{12}, G^1, G^2, W^1$, and $W^2$ further have a substituent, examples include the following substituents.

Examples of the substituent include a halogen atom, an alkyl group, an aralkyl group, an alkenyl group, an alkynyl group, an aryl group, a heterocyclic group, a cyano group, a hydroxy group, a nitro group, an alkoxy group, an aryloxy group, a silyloxy group, a heterocyclic oxy group, an acyloxy group, a carbamoyloxy group, an alkoxycarbonyloxy group, an aryloxy carbonyloxy group, an amino group, an acylamino group, an aminocarbonylamino group, an alkoxycarbonylamino group, an aryloxycarbonylamino group, a sulfamoylamino group, an alkyl- or an aryl-sulfonylamino group, a mercapto group, an alkylthio group, an arylthio group, a heterocyclic thio group, a sulfamoyl group, an alkyl- or arylsulfinyl group, an alkyl- or aryl-sulfonyl group, an acyl group, an aryloxycarbonyl group, an alkoxycarbonyl group, a carbamoyl group, an aryl- or heterocyclic-azo group, an imide group, a phosphino group, a phosphinyl group, a phosphinyloxy group, a phosphinylamino group, and a silyl group.

The azo pigment in the present invention also includes tautomers of the azo pigments represented by Formula (1) in the scope thereof. Although Formula (1) is shown in the form of a limiting structure among possible various kinds of tautomers in terms of a chemical structure, tautomers having structures other than the shown structure may be acceptable and a mixture containing a plurality of tautomers may be used.

For example, azo-hydrazone tautomers of the azo pigments represented by Formula (1) may be represented by Formula (1').

The invention also includes the compounds represented by Formula (1'), which are tautomers of the azo pigments represented by Formula (1), in the scope.

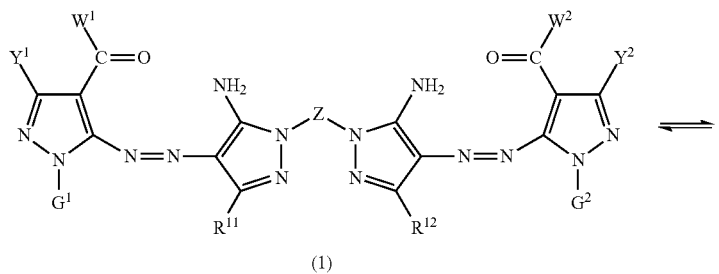

(1)

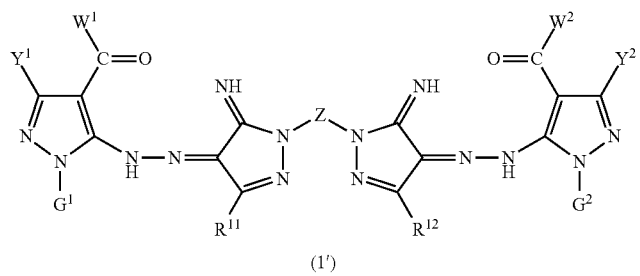

(1')

In Formula (1') $R^{11}$, $R^{12}$, $Y^1$, $Y^2$, $G^1$, $G^2$, and Z are the same as $R^{11}$, $R^{12}$, $W^1$, $W^2$, $Y^1$, $Y^2$, $G^1$, $G^2$, and Z, respectively, in Formula (1).

With respect to a preferable combination of the substituents in the compounds represented by Formula (1), compounds are preferable in which at least one of the various substituents is the preferable group mentioned above, compounds are more preferable in which a large number of the various substituents are the preferable groups mentioned above, and compounds are the most preferable in which all of the substituents are the preferable groups mentioned above.

Particularly preferable combinations of the groups in the azo pigments represented by Formula (1) of the present invention include at least one of the following (a) to (e).

(a) $W^1$ and $W^2$ each independently preferably represent an alkoxy group (e.g., methoxy ethoxy, i-propoxy, and t-butoxy), an amino group (e.g., —$NH_2$, methylamino, dimethylamino, and anilino), an alkyl group (e.g., methyl, ethyl, n-propyl, i-propyl, t-butyl, and cyclopropyl), or an aryl group (e.g., phenyl, p-tolyl, and naphthyl). Among the above, an alkoxy group, an amino group, or an alkyl group is preferable, an alkoxy group or an amino group is more preferable, an alkoxy group having a total number of carbon atoms of 5 or lower, an amino group (—$NH_2$), and an alkylamino group having a total number of carbon atoms of 5 or lower are still more preferable, and an alkoxy group having a total number of carbon atoms of 3 or lower, an amino group (—$NH_2$), and an alkylamino group having a total number of carbon atoms of 3 or lower are particularly preferable. Among the above, a methoxy group (—$OCH_3$) is the most preferable.

(b) $R^{11}$ and $R^{12}$ each independently represent a hydrogen atom or a substituent (e.g., a substituted or unsubstituted acylamino group having a total number of carbon atoms of 1 to 8, a substituted or unsubstituted alkyl group having a total number of carbon atoms of 1 to 12, a substituted or unsubstituted aryl group having a total number of carbon atoms of 6 to 18, or a substituted or unsubstituted heterocyclic group having a total number of carbon atoms of 4 to 12), more preferably a straight or branched chain alkyl group having a total number of carbon atoms of 1 to 8, and still more preferably a methyl group, an iso-propyl group, or a tert-butyl group with a tert-butyl group being the most preferable among the above.

(c) Z represents a divalent group derived from a 5- to 8-membered nitrogen-containing heterocyclic group and the divalent group may be further fused. Examples of the nitrogen-containing heterocyclic group include a 5- or 6-membered substituted or unsubstituted nitrogen-containing heterocyclic group, such as a pyrrole ring, a pyrazole ring, a triazole ring, an imidazole ring, a thiazole ring, an isothiazole ring, an oxazole ring, an isoxazole ring, a thiadiazole ring, a thiophene ring, a furan ring, a pyridine ring, a pyrimidine ring, a triazine ring, a pyridazine ring, and a pyrazine ring, and a 6-membered nitrogen-containing heterocyclic group having 3 to 10 carbon atoms are particularly preferable. Examples of a more preferable heterocyclic group include a pyridine ring, a pyrimidine ring, an s-triazine ring, a pyridazine ring, and a pyrazine ring. A pyrimidine ring and an s-triazine ring are still more preferable, and a pyrimidine ring is most preferable among the above.

(d) $G^1$ and $G^2$ each independently represent a hydrogen atom, an alkyl group, a cycloalkyl group, an aralkyl group, an alkenyl group, an alkynyl group, an aryl group, or a heterocyclic group. A hydrogen atom, a methyl group, an ethyl group, an n-propyl group, an iso-propyl group, a t-butyl group, a cyclopropyl group, a benzyl group, 2-phenethyl group, a vinyl group, an allyl group, an ethynyl group, a propargyl group, a phenyl group, p-tolyl group, a naphthyl group, a pyridyl group, a pyrimidinyl group, and a pyrazinyl group are particularly preferable and a hydrogen atom, a methyl group, a phenyl group, a pyridyl group, a pyrimidinyl group, and a pyrazinyl group are still more preferable. Among the above, a methyl group, a 2-pyridyl group, a 2,6-pyrimidinyl group, and a 2,5-pyrazinyl group are preferable.

The alkyl group represented by $G^1$ and $G^2$ is more preferably an alkyl group having a total number of carbon atoms of 5 or lower, still more preferably an alkyl group having a total number of carbon atoms of 3 or lower, and most preferably a methyl group.

(e) $Y^1$ and $Y^2$ each independently represent a hydrogen atom, an alkyl group (e.g., methyl), an aryl group (e.g., phenyl), a heterocyclic group (e.g., 2-pyridyl), or an alkylthio group (e.g., methylthio). A hydrogen atom, a methyl group, a phenyl group, and a methylthio group are preferable, and, among the above, a hydrogen atom is particularly preferable.

Among the azo pigments represented by Formula (1) used in the present invention, the azo pigments represented by Formula (2) are preferable.

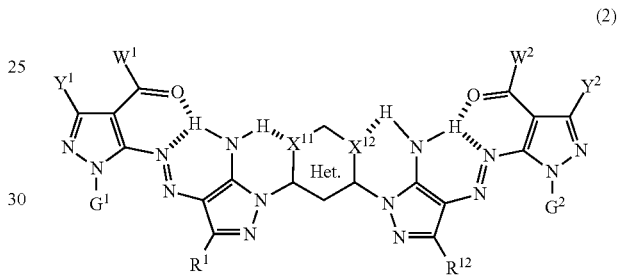

(2)

$G^1$, $G^2$, $R^{11}$, $R^{12}$, $W^1$, $W^2$, $Y^1$, and $Y^2$ in Formula (2) are the same as $G^1$, $G^2$, $R^{11}$, $R^{12}$, $W^1$, $W^2$, $Y^1$, and $Y^2$ respectively, in Formula (1).

$X^{11}$ and $X^{12}$ each independently represent a hetero atom in a divalent group (Het.) derived from the nitrogen-containing heterocyclic compound represented by Z in Formula (1).

In the present invention, the azo pigments represented by Formula (1) may have a large number of tautomers.

The azo pigments represented by Formula (1) in the present invention preferably have substituents capable of forming intramolecular hydrogen bonds or intramolecular cross hydrogen bonds. The azo pigments represented by Formula (1) in the invention preferably have substituents capable of forming at least one intramolecular cross hydrogen bond, more preferably have substituents capable of forming at least three intramolecular hydrogen bonds, and particularly preferably have substituents capable of forming at least three intramolecular hydrogen bonds wherein at least two hydrogen bonds of the at least three intramolecular hydrogen bonds are intramolecular cross hydrogen bonds.

Among the azo pigments represented by Formula (1), examples of the particularly preferable azo pigments include the azo pigments represented by Formula (2) as described above.

A factor for the fact that the structure is preferable resides in that, for example, as shown in Formula (2), the nitrogen atom, the hydrogen atom, and the hetero atom (a nitrogen atom of an azo group or a hydrazone group which is a tautomer thereof and an oxygen atom of a carbonyl group or a nitrogen atom of an amino group) constituting the heterocyclic ring contained in the azo pigment structure easily form at least one intramolecular cross hydrogen bond (intramolecular hydrogen bond).

A factor for the fact that the structures are preferable resides in that, for example, as shown in Formula (2), the nitrogen atom, and the hydrogen atom and the hetero atom of an amino group (e.g., a nitrogen atom of an azo group or a hydrazone group which is a tautomer thereof and an oxygen atom of a carbonyl group or a nitrogen atom of an amino group) constituting the heterocyclic group contained in the azo pigment easily form at least four intramolecular hydrogen bonds and easily form at least two intramolecular cross hydrogen bonds.

As a result, the flatness of the molecule is increased, the intramolecular/intermolecular interaction is improved, the crystallinity of the azo pigments represented by, for example, Formula (2) becomes high (easily forms a high order structure), and light fastness, thermal stability, wet heat stability, water resistance, gas resistance and/or solvent resistance, which are properties required as pigments, are conspicuously increased. Thus, the above structure is the most preferable example.

The azo pigment used in the present invention may contain isotopes (e.g., $^2$H, $^3$H, $^{13}$C, and $^{15}$N) in the compounds represented by Formula (1).

Specific examples (Exemplified Compounds Pig.-1 to Pig.-48) of the azo pigments represented by Formula (1) are shown below. However, the invention is not limited to these examples. The structures of the following specific examples are represented in the form of a limiting structure among various kinds of possible tautomers in the chemical structure. However, it is a matter of course that tautomer structures other than the shown structures may be acceptable.

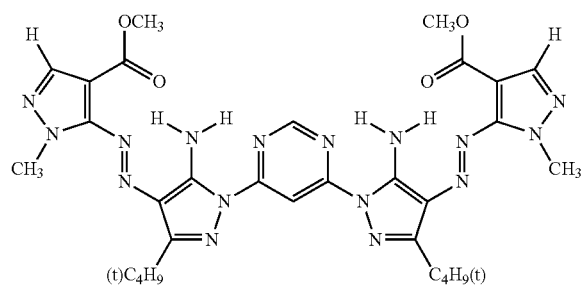

Pig.-1

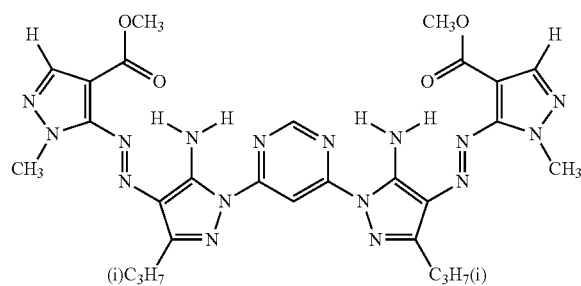

Pig.-2

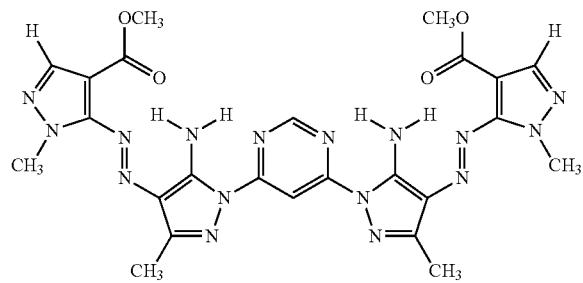

Pig.-3

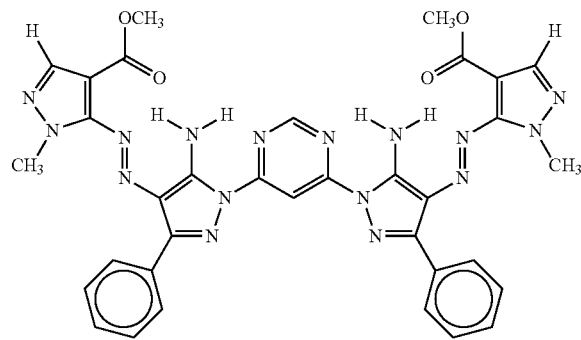

Pig.-4

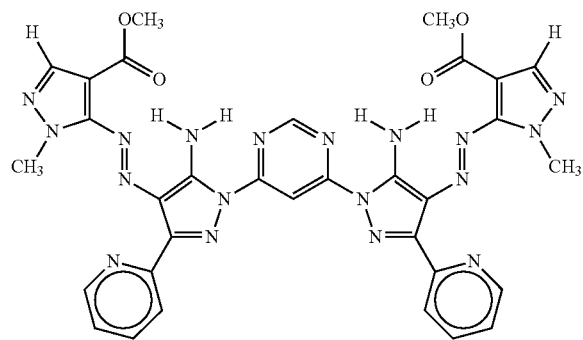

Pig.-5

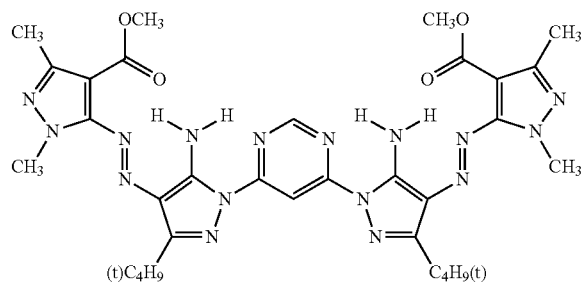

Pig.-6

-continued
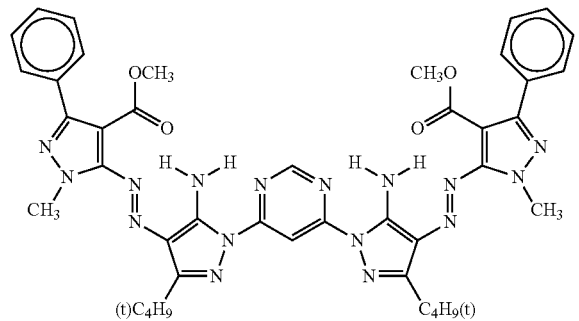
Pig.-7
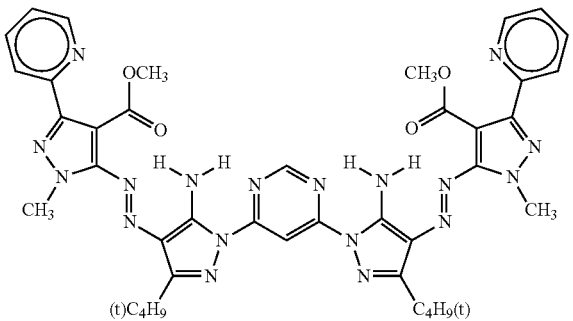
Pig.-8
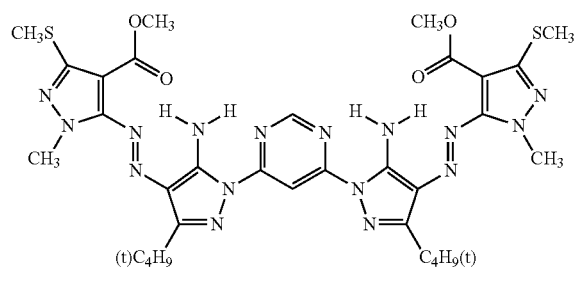
Pig.-9
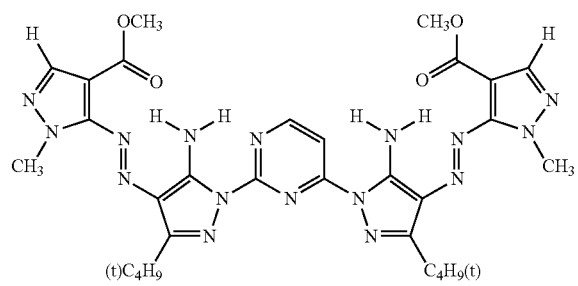
Pig.-10
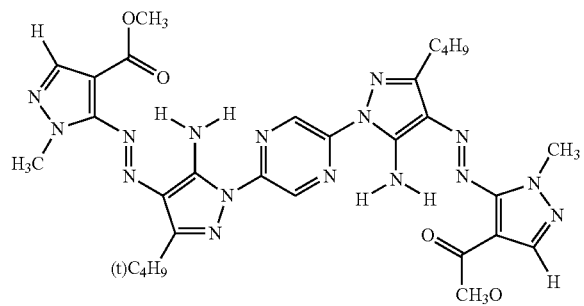
Pig.-11
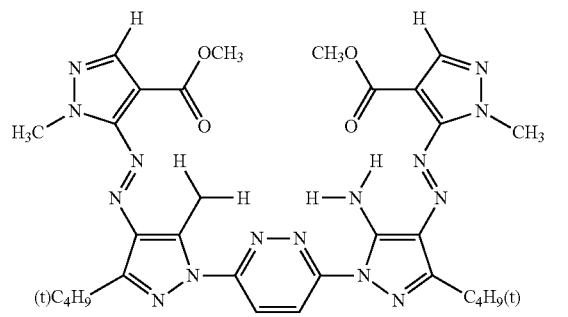
Pig.-12
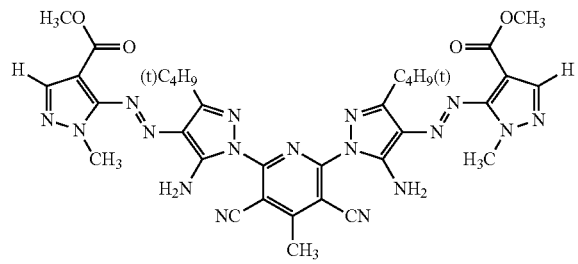
Pig.-13
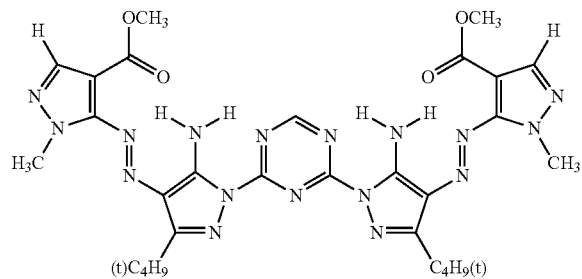
Pig.-14
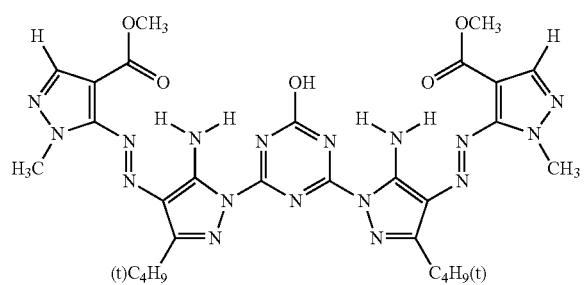
Pig.-15
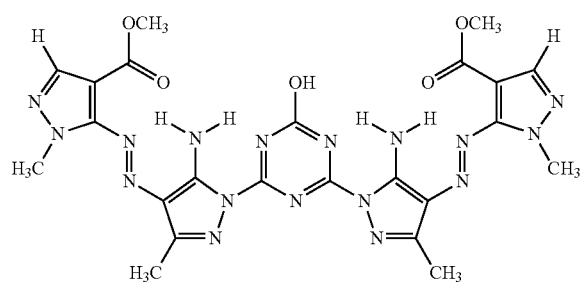
Pig.-16

-continued
Fig.-25
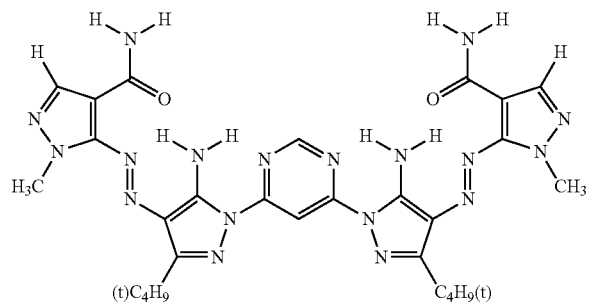
Fig.-26
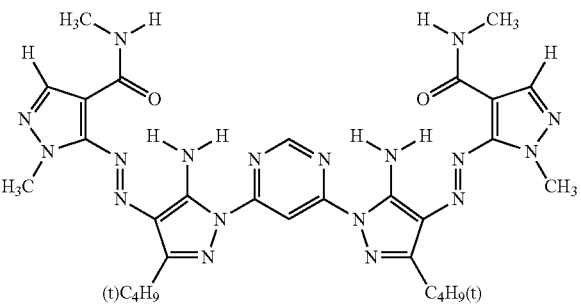
Fig.-27
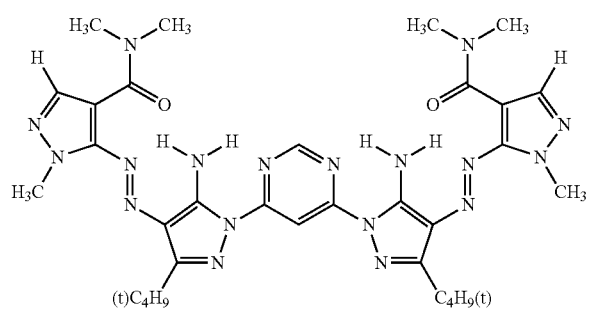
Fig.-28
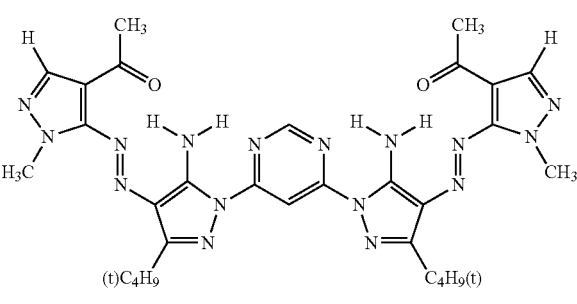
Fig.-29
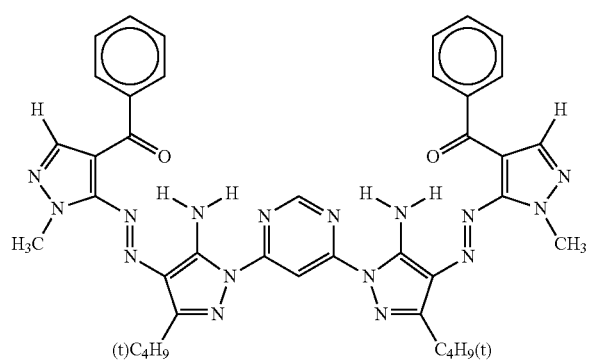
Fig.-30
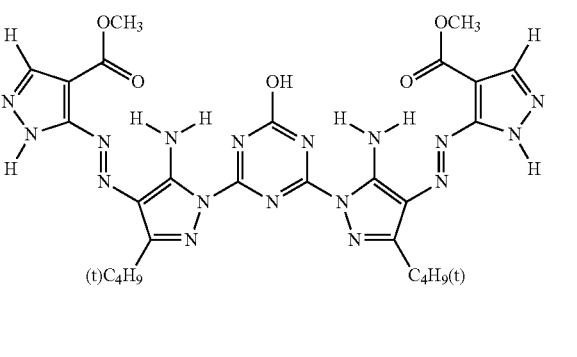
Fig.-31
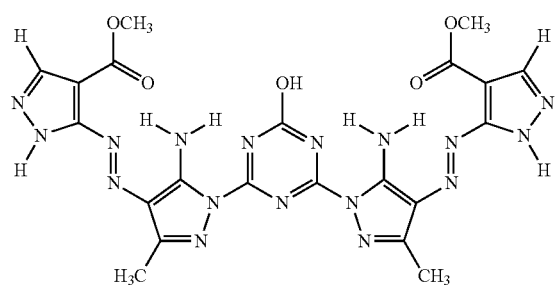
Fig.-32
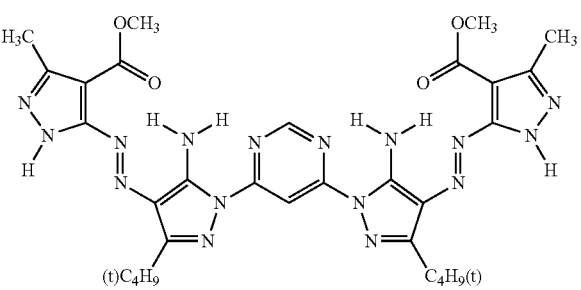
Fig.-33
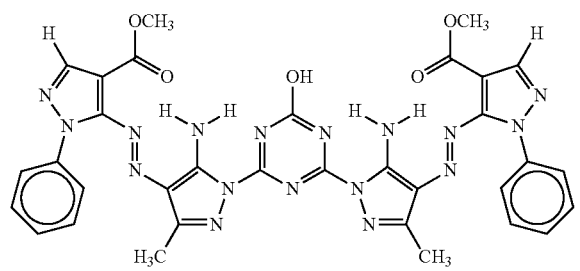
Fig.-34

-continued
Pig.-35
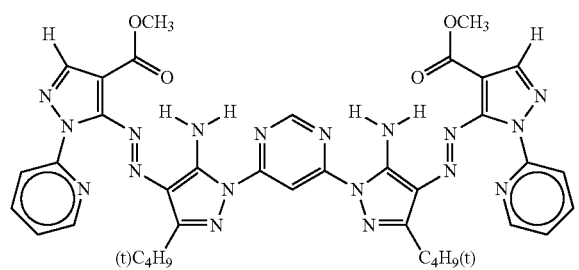
Pig.-36
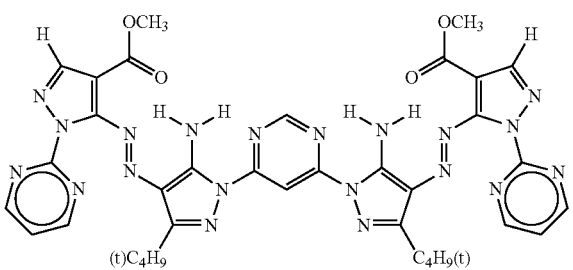
Pig.-37
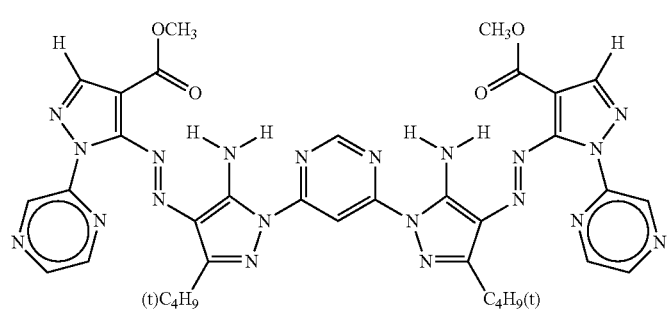
Pig.-38
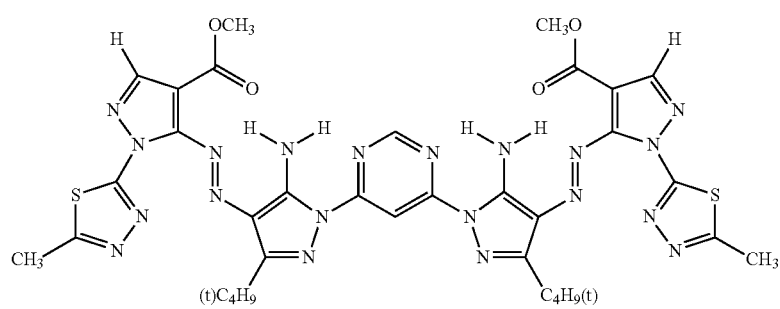
Pig.-39
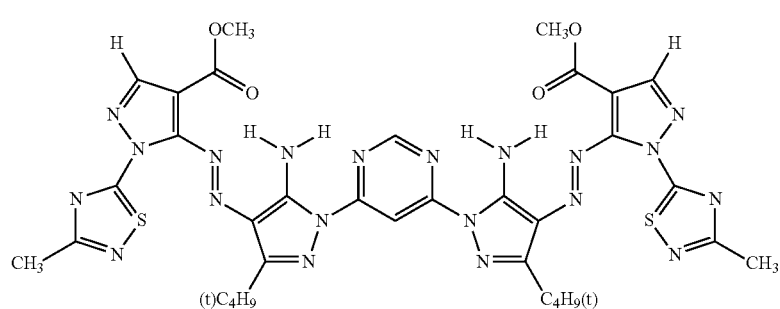
Pig.-40
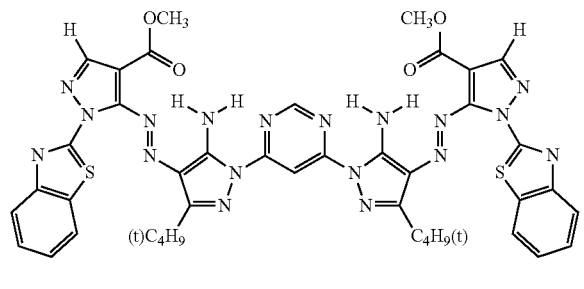
Pig.-41
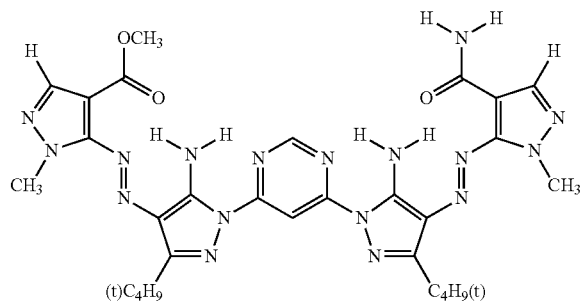

-continued

Pig.-42

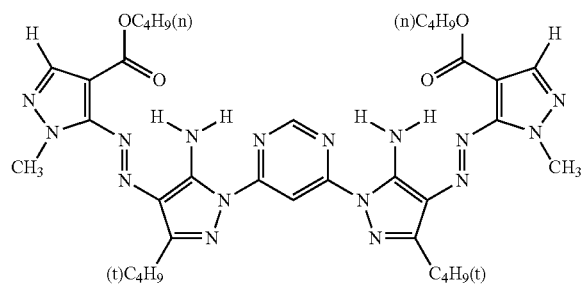

Pig.-43

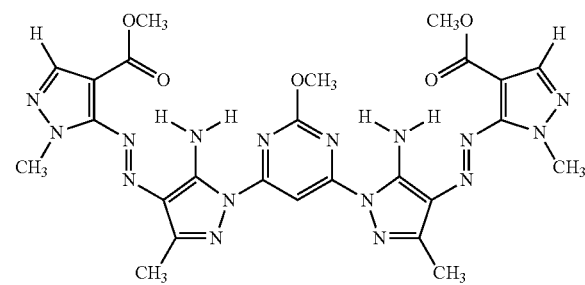

Pig.-44

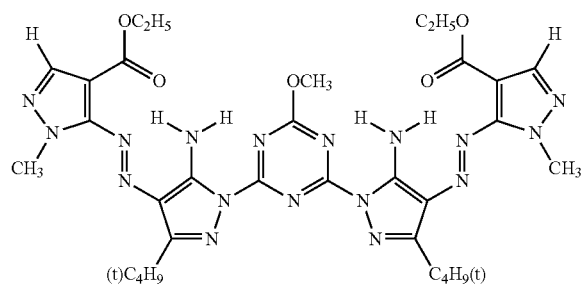

Pig.-45

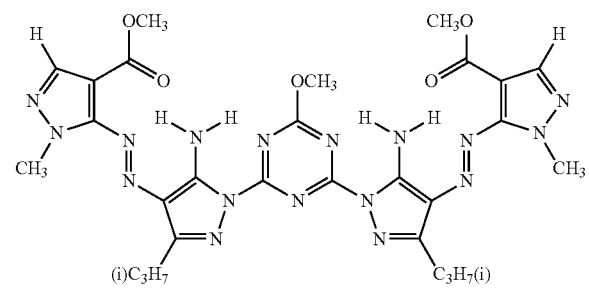

Pig.-46

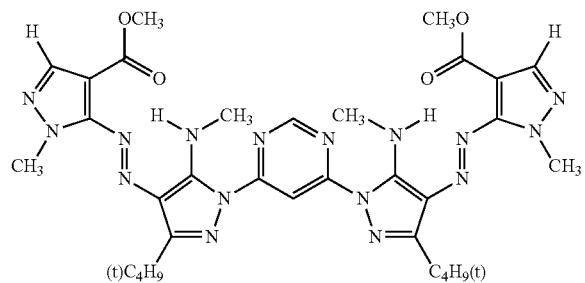

Pig.47

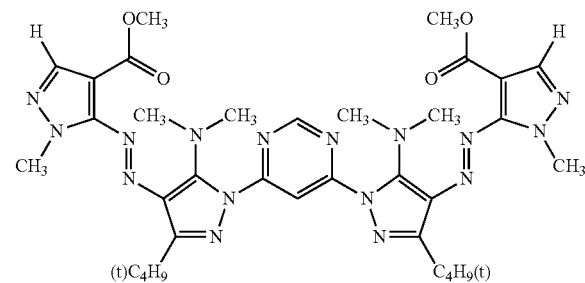

Pig.-48

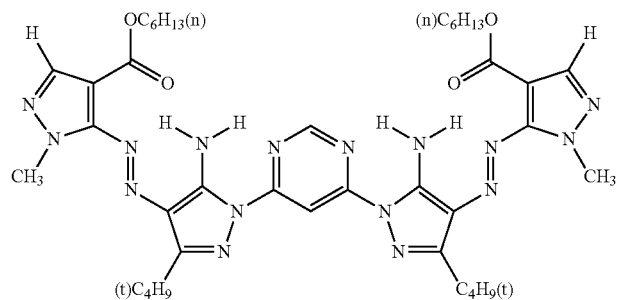

With respect to the azo pigments represented by Formula (1) in the present invention, the chemical structure formula may be Formula (1) or a tautomer thereof and the crystal form is not particularly limited. For example, pigments having any crystal form which is sometimes referred to as a polymorphism (crystal polymorphism) may be acceptable.

The crystal polymorphism refers to crystals in which the chemical compositions are the same but the arrangements of building blocks (molecules or ions) are different in the crystals. In the crystal polymorphism, the chemical and physical properties are determined depending on the crystal structure and each crystal polymorphism can be distinguished by the rheology, hue, and other color characteristics. Different crystal polymorphism can also be confirmed by X-Ray Diffraction (powder X-ray diffraction measurement results) or X-Ray Analysis (X ray crystal structure analysis results).

When the crystal polymorphism is present in the azo pigments represented by Formula (1) in the present invention, the crystal type may be any polymorphism and may be a mixture of two or more polymorphisms. Azo pigments having a single crystal type are preferably used as the main ingredients. More specifically, the degree of the mixture of crystal polymorphisms is preferably low. The content of azo pigments having a single crystal type is 70% to 100%, preferably 80% to 100%, more preferably 90% to 100%, still more preferably 95% to 100%, and particularly preferably 100% relative to the whole azo pigment By using the azo pigments having a single crystal type as the main ingredients, the regularity of the arrangement of dye molecules is improved and the intramolecular/intermolecular interaction is increases, which results in easy formation of a high order three-dimensional network. As a result, the azo pigments are preferable in terms of the properties required in pigments, such as improvement of hue, or light fastness, heat fastness, humidity fastness, oxidized gas fastness, or solvent resistance.

The mixture ratio of the crystal polymorphisms in the azo pigments can be confirmed from the physicochemical measurement values of solids, such as single crystal X-ray crystal structure analysis, powder X-ray diffraction (XRD), microphotographs (TEM) of crystals, or IR (KBr Method).

In the present invention, when the azo pigments represented by Formula (1) have an acid radical, the acid radical may be partially or entirely a salt type or may contain a mixture of a salt type pigment and a free acid type pigment. Examples of the salt type include salts of alkaline metals, such as Na, Li, and K, salts of ammonium that may be substituted with an alkyl group or a hydroxyalkyl group, or salts of organic amines. Examples of the organic amines include a lower alkyl amine, a hydroxyl-substituted lower alkyl amine, a carboxyl-substituted lower alkyl amine, and a polyamine having 2 to 10 alkylene imine units, the unit having 2 to 4 carbon atoms. In the case of the salt types, the type is not limited to one type and a plurality of types may be mixed.

In the structure of the azo pigments to be used in the present invention, when a plurality of acid radicals are contained in the molecule thereof, the plurality of acid radicals each are independently a salt type or an acid type and may be different from each other.

In the invention, the azo pigments represented by Formula (1) may be a hydrate containing water molecules in the crystals and the number of the water molecules contained in the crystals is not particularly limited.

Next, an example of a method for producing the azo pigments represented by Formula (1) will be described. For example, the azo pigments represented by Formula (1) can be produced by converting a heterocyclic amine represented by Formula (A) to a diazonium compound under the acidic condition, performing a coupling reaction between the diazonium compound and the compound represented by Formula (B), and subjecting the reaction mixture to a post-treatment according to a usual manner.

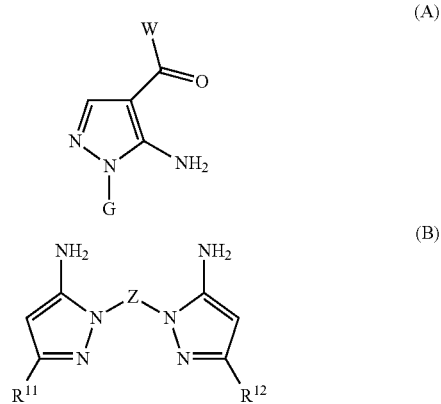

In Formulae (A) and (B), W is the same as $W^1$ and $W^2$ in Formula (1), G is the same as $G^1$ and $G^2$ in Formula (1), and $R^{11}$, $R^{12}$, and Z are the same as $R^{11}$, $R^{12}$, and Z, respectively, in Formula (1).

The heterocyclic amine represented by Formula (A) can be produced by known methods in common use, such as the method described in Helv. Chim. Acta, 41, 1958, 1052-1056 or Helv. Chim. Acta, 42, 1959, 349-352, and methods similar thereto.

The compounds represented by Formula (B) can be produced by the methods described in International Publication WO 2006/082669 A1 or JP-A No. 2006-57076 and methods similar thereto.

The reaction of converting the heterocyclic amine represented by Formula (A) to a diazonium compound can be performed by, for example, reacting reagents, such as sodium nitrite, nitrosylsulfuric acid, or isoamyl nitrite in acidic solvents, such as sulfuric acid, phosphoric acid, acetic acid, hydrochloric acid, or methanesulfonic acid at a temperature of 15° C. or lower for a period of about 10 minutes to about 6 hours.

The coupling reaction can be performed by reacting the diazonium salt obtained by the method described above and the compounds represented by Formula (B) at 40° C. or lower and preferably 25° C. or lower for a period of about 10 minutes to about 12 hours.

After completion of the reaction, sometimes deposition of crystals are found. However, generally, water, an alcohol solvent or the like is added to the reaction liquid to deposit the crystals, and the deposited crystals can be collected by filtration. The crystals collected by filtration may be washed and dried as required, thereby obtaining the azo pigment represented by Formula (1).

The azo pigment represented by Formula (1) is obtained as a crude azo pigment by the production method described above. However, when an azo pigment is used in the present invention, post-treatment is preferably performed. Examples of methods for the post-treatment include a pigment particle controlling process by a polishing (abrasive) technique, such as solvent salt milling, salt milling, dry milling, solvent milling, or acid pasting, or solvent heating treatment and a surface treatment process using resins, surfactants, dispersing agents, and the like.

For the azo pigments represented by Formula (1) according to the invention, the solvent heating treatment and/or the solvent salt milling is preferably performed as the post-treatment.

Examples of solvents to be used for the solvent heating treatment include water; aromatic hydrocarbon solvents, such as toluene, or xylene; halogenated hydrocarbon solvents, such as chlorobenzene or o-dichlorobenzene; alcohol solvents, such as isopropanol or isobutanol; polar aprotic organic solvents, such as N,N-dimethyl formamide, N,N-dimethyl acetamide; or N-methyl 2-pyrrolidone, glacial acetic acid, pyridine, or mixtures thereof. Inorganic or organic acids or bases may be added to the solvents mentioned above. The temperature of the solvent heating treatment varies depending on the dimension of the primary particle size of a desired pigment and is preferably 40 to 150° C. and more preferably 60 to 100° C. The treatment time is preferably from 30 minutes to 24 hours.

Examples of the solvent salt milling include a method of putting a crude azo pigment, a mineral salt, and an organic solvent that does not dissolve these components in a kneader, and kneading and polishing the mixture therein. Preferable examples of the mineral salts include water-soluble mineral salts. For example, mineral salts such as sodium chloride, potassium chloride, or sodium sulfate are preferably used. Mineral salts having an average particle size of 0.5 to 50 μm are more preferably used. The used amount of the mineral salts is preferably from 3 to 20 times by mass and more preferably 5 to 15 times by mass that of the crude azo pigment. Preferable examples of the organic solvent include water-soluble organic solvents. However, since the solvents are likely to evaporate due to increase in temperature during kneading, high boiling point solvents are preferable in terms of safety.

Examples of such water-soluble organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, or a mixture thereof. The use amount of the water-soluble organic solvents is preferably 0.1 to 5 times by mass that of the crude azo pigment. The kneading temperature is preferably 20 to 130° C. and particularly preferably from 40 to 110° C. As the kneader, for example, a kneader or a mixing muller can be used.

The smaller average particle size of the organic pigments, the better from the viewpoint of transparency and color reproduction properties, while the larger average particle size of the organic pigments, the better from the viewpoint of light fastness. In order to achieve these properties in combination, the average particle size is preferably 10 to 200 nm, more preferably 10 to 150 nm, and still more preferably 10 to 120 nm. The particle size distribution of the organic pigments is not particularly limited. Any suitable organic pigments having a large particle size distribution or a monodisperse particle size distribution may be acceptable. Two or more kinds of the organic pigments having a monodisperse particle size distribution may be mixed for use.

The content of the pigments is preferably 1 to 25% by mass, more preferably 2 to 20% by mass, still more preferably 5 to 20% by mass, and particularly preferably 5 to 15% by mass relative to the total mass of the ink composition.

Dispersing Agent

The ink composition of the present invention may contain at least one dispersing agent. As the dispersing agent of the pigment, any suitable polymer dispersing agents or low molecular surfactant type dispersing agents may be acceptable. The polymer dispersing agents may be water-soluble dispersing agents or water-insoluble dispersing agents.

The low molecular surfactant type dispersing agents can make the pigment disperse stably in a water solvent while maintaining the ink at a low viscosity. The low molecular surfactant type dispersing agents are low molecular dispersing agents having a molecular weight of 2,000 or lower. The molecular weight of the low molecular surfactant type dispersing agents is preferably 100 to 2,000 and more preferably 200 to 2,000.

The low molecular surfactant type dispersing agents have a structure containing a hydrophilic group and a hydrophobic group. One or more hydrophilic groups and one or more hydrophobic groups may each independently be contained in the molecule of the dispersing agent and plural kinds of hydrophilic groups or hydrophobic groups may be contained in the molecule. A linking group for connecting the hydrophilic group and the hydrophobic group may be contained as appropriate.

Examples of the hydrophilic group include an anionic group, a cationic group, a nonionic group, or a betaine type group in which these groups are combined. Any suitable anionic group may be used insofar as the anionic group has a negative charge. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group and a carboxylic acid group, and still more preferably a carboxylic acid group. Any suitable cationic group may be used insofar as the cationic group has a positive charge and is preferably an organic cationic substituent and more preferably a cationic group of nitrogen or phosphorus. The cationic group is still more preferably pyridinium cation or ammonium cation. Examples of the nonionic group include polyethylene oxide, polyglycerin, and a part of sugar units.

The hydrophilic group is preferably an anionic group.

When the low-molecular surfactant-type dispersant has an anionic hydrophilic group, the dispersant preferably has a pKa of 3 or more, in terms of promoting coagulation reaction upon contacting with an acidic treatment liquid. The pKa mentioned here is an experimentally-obtained value based on a titration curve which is obtained by titrating a 1 mmol/L solution of a low-molecular surfactant-type dispersant in tetrahydrofuran/water at a ratio of 3:2 (THF-water, V/V) with an acid or alkali aqueous solution. When the pKa of the low-molecular surfactant-type dispersant is 3 or more, 50% or more of the anionic groups theoretically become undissociated upon contact with a liquid having a pH of around 3. Accordingly, the water-solubility of the low molecular surfactant-type dispersant is significantly reduced, as a result of which a coagulation reaction occurs, namely, the coagulation reactivity is improved. From this point of view, the low-molecular surfactant-type dispersant preferably has a carboxyl group as an anionic group.

The hydrophobic group has, for example, a hydrocarbon structure, a fluorocarbon structure, or a silicone structure. Among these, the hydrocarbon structure is especially preferable. The hydrophobic group may have either a straight-chain structure or a branched structure. Further, the hydrophobic group may have a single-chain structure or multi-chain structure. When there are two or more chains, the chains may include two or more kinds of hydrophobic group. The hydrophobic group is preferably a hydrocarbon group having a carbon number of from 2 to 24, more preferably from 4 to 24, and yet more preferably from 6 to 20.

When the polymeric dispersant is a water-soluble dispersant, examples thereof include a hydrophilic polymeric dispersant. Examples of natural hydrophilic polymeric compounds include plant polymers such as gum arabic, gum tragacanth, guar gum, gum karaya, locust bean gum, arabinogalactan, pectin and quince seed starch; marine alga polymers such as alginic acid, carrageenan and agar; animal polymers such as gelatin, casein, albumin and collagen; and microbial polymers such as xanthene gum and dextran.

Examples of hydrophilic polymeric compounds obtained by modifying natural raw materials include fibrous polymers such as methyl cellulose, ethyl cellulose, hydroxyethyl cellulose, hydroxypropyl cellulose and carboxymethyl cellulose; starch polymers such as sodium starch glycolate (sodium salt of starch glycolate), and sodium starch phosphate (sodium salt of starch phosphate [ester]); and marine alga polymers such as sodium alginate and propylene glycol alginate.

Examples of synthetic hydrophilic polymeric compounds include vinyl polymers such as polyvinyl alcohol, polyvinyl pyrrolidone and polyvinyl methyl ether; acrylic resins such as non-crosslinked polyacrylamide, polyacrylic acid or an alkali metal salt thereof, and water-soluble styrene acrylic resins; water-soluble styrene maleic acid resin; water-soluble vinylnaphthalene acrylic resin; water-soluble vinylnaphthalene maleic acid resins; alkali metal salts of formalin condensates of β-naphthalene sulfonic acid; polymeric compounds having, at a side chain, a salt of a cationic functional group such as a quaternary ammonium group or an amino group; and natural polymeric compounds such as shellac.

Among these, water-soluble dispersants to which a carboxyl group is introduced are preferable, and examples thereof include homopolymers of acrylic acid, methacrylic acid or styrene acrylic acid, and copolymers of the above monomer (s) with another monomer having a hydrophilic group.

The water-insoluble dispersants include a polymer having both hydrophilic and hydrophobic moieties, such as styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the polymer dispersant is preferably from 3,000 to 100,000, more preferably from 5,000 to 50,000, further preferably from 5,000 to 40,000, and yet further preferably from 10,000 to 40,000.

The acid value of the polymer dispersant is preferably not more than 130 mgKOH/g, in view of achieving excellent coagulation properties when contacting with the treatment liquid. The acid value is more preferably from 25 mgKOH/g to 120 mgKOH/g, and still more preferably from 25 mgKOH/g to 100 mgKOH/g. When the acid value of the polymer dispersant is 130 mgKOH/g or less, especially 100 mgKOH/g or less, the pigment becomes relatively hydrophobic. When the acid value of the polymer dispersant is 25 mgKOH/g or more, the stability of the self-dispersing properties becomes satisfactory.

The polymer dispersant preferably includes a polymer having a carboxyl group, more preferably a polymer having a carboxyl group and an acid value of from 25 mgKOH/g to 100 mgKOH/g, from the viewpoint of the self-dispersing properties and the coagulation speed at the time when the self-dispersing polymer contacts a treatment liquid.

The mixing ratio by mass of pigment (p) to dispersant (s) (p:s) is preferably in a range of from 1:0.06 to 1:3, more preferably in a range of from 1:0.125 to 1:2, and still more preferably in a range of from 1:0.125 to 1:1.5.

In the present invention, when a dye is used as a colorant, a dye retained on a water-insoluble carrier may be used as a water-insoluble colored particle. The dye may be selected from known dyes without particular restrictions, and the dyes described in, for example, JP-A Nos. 2001-115066, 2001-335714, and 2002-249677 may be used suitably in the present invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the present invention.

The carrier retaining the dye (water-insoluble colorant particle) may be used in the form of an aqueous dispersion containing a dispersant. As the dispersant, the above-mentioned dispersants may be used suitably.

In the present invention, the ink composition preferably includes a pigment and a dispersant, more preferably includes an organic pigment and a polymer dispersant, and particularly preferably includes an organic pigment and a polymer dispersant containing a carboxyl group, in consideration of the light-fastness, quality, and the like of the image. From the viewpoint of coagulation properties, it is preferable that the pigment is covered with a polymer dispersant having a carboxyl group and is water-insoluble.

The average particle diameter of the pigment in the dispersion state is preferably from 10 nm to 200 nm, more preferably from 10 nm to 150 nm, and still more preferably from 10 nm to 100 nm. When the average particle diameter is 200 nm or less, color reproducibility is excellent, and ejecting properties are excellent when ejecting droplets by an inkjet method. When the average particle diameter is 10 nm or more, light fastness becomes excellent. The particle size distribution of the colorant is not particularly limited, and may be a broad particle size distribution or a monodispersed particle size distribution. It is also possible to use a mixture of two or more colorants having monodispersed particle size distributions.

The average particle diameter of the pigment in the dispersion state and the average particle diameter and the particle size distribution of the polymer particles are obtained by measuring volume average particle diameter by a dynamic light scattering method, using a Nanotrac particle size distribution measuring instrument UPA-EX150 (trade name, manufactured by NIKKISO Co., Ltd.).

The pigment may be used singly or in combination of two or more thereof. From the view point of image density, the content of pigment in the ink composition is preferably from 1 to 25% by mass, more preferably from 2 to 20% by mass, still more preferably from 5 to 20% by mass, and particularly preferably from 5 to 15% by mass, with respect to the ink composition.

Polymer Particle

In the present invention, the ink composition includes at least one type of polymer particles having an ethylene oxide chain [$(C_2H_4O)_n$ chain (n represents a positive integer)] in the side chain. The polymer particles have a function to immobilize the ink composition in the manner as described below when contacting with the below-mentioned treatment liquid or an area on which the treatment liquid has been applied and dried. Namely, when contacting with the treatment liquid or the area, the dispersion state of the polymer particles becomes unstable and the polymer particles aggregate, whereby the viscosity of the ink is increased and the immobilization of the ink composition is achieved. Thus, the polymer particles further improve the fixability of the ink composition to a recording medium and the rubbing resistance of an image.

In the present invention, the polymer particles have the ethylene oxide chain (EO chain) in the side chain. The ink composition in the present invention contains a pigment, polymer particles, and a water-soluble polymerizable compound. According to the ink composition, by polymerizing the polymerizable compound after image formation, the fixability of the image to a recording medium and the rubbing resistance of the image are increased. On the other hand, when a uniform solid image is output, reduction in the gloss depending on minute surface unevenness is likely to be caused. As a result of extensive studies on the reduction in the gloss, though the details are not clear, the inventors have found that the reduction in the gloss has influence on the combination of the structure of monomers for constituting the polymer particles and the structure of the polymerizable compound. Then, when the polymer particles have the EO chain in the side chain and particularly when the polymerizable compound also has the EO chain, the reduction in the gloss can be suppressed without deteriorating other performances (particularly ink stability, ink ejection properties, image formation ability, rubbing resistance, image adhesion properties, and the like).

Examples of preferable properties required in the polymer particles include reactivity with a coagulant in addition to the properties described above.

As the polymer particles that react with a coagulant polymer particles having anionic surface charge may be used. As the polymer particles, commonly known latex may be used as long as sufficient reactivity and ejecting stability are obtained. Among these polymer particles, it is especially preferable to use self-dispersing polymer particles.

In the following, self-dispersing polymer particles, as an example of preferable polymer particles, are described in detail.

Self-Dispersing Polymer Particles

In the present invention, the ink composition preferably includes, as the polymer particles, at least one type of self-dispersing polymer particles. The self-dispersing polymer particles have a function to immobilize the ink composition when contacting with the below-mentioned treatment liquid or an area on which the treatment liquid has been applied and dried. When contacting with the treatment liquid or the area, the dispersion state of the self-dispersing polymer particles becomes unstable and the self-dispersing polymer particles aggregate, whereby the viscosity of the ink is increased and the immobilization of the ink composition is achieved. Thus, the self-dispersing polymer particles further improve the fixability of the ink composition to a recording medium and the rubbing resistance of an image. The self-dispersing polymer particles are considered to be preferable resin particles also from the viewpoint of ejecting stability and liquid stability (particularly, dispersion stability) of the system containing the pigment.

The self-dispersing polymer particles are particles of a water-insoluble polymer that does not contain a free emulsifier and that can get into a dispersed state (particularly, dispersed state achieved by a phase inversion emulsification) in an aqueous medium even in the absence of the other surfactants due to a functional group (particularly, an acidic group or a salt thereof) which the polymer itself has.

The scope of the term, "dispersed state", used herein includes an emulsified state (emulsion) in which a water-insoluble polymer in the liquid state is dispersed in an aqueous medium and a state (suspension) in which a water-insoluble polymer in the solid state is dispersed in an aqueous medium.

The water-insoluble polymer used in the present invention is preferably a water-insoluble polymer that can get into a dispersed state in which the water-insoluble polymer is dispersed in the solid state, in consideration of the aggregation speed and the fixability when the water-insoluble polymer is contained in a liquid composition.

Examples of a method for preparing an emulsified or dispersed self-dispersible polymer, i.e., an aqueous dispersion of the self-dispersible polymer, include a phase inversion emulsification method. Examples of the phase inversion emulsification method include a method including: dissolving or dispersing the self-dispersible polymer in a solvent (e.g., a hydrophilic organic solvent), putting the resultant substance as it is in water without adding a surfactant, stirring and mixing the resultant substance in a state where a salt-producing group (e.g., an acidic group) of the self-dispersible polymer is neutralized, and removing the solvent, thereby obtaining an emulsified or dispersed aqueous dispersion.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic), the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

The term "water-insoluble polymer" used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility mentioned above is a value measured after the polymer is 100% neutralized with either sodium hydroxide or acetic acid depending on the kind of the salt-forming groups of the water-insoluble polymer.

The aqueous medium includes water as a component and, optionally, a hydrophilic organic solvent. In the present invention, the aqueous medium is preferably formed by water and a hydrophilic organic solvent whose amount is 0.2% by mass or less with respect to the amount of the water, and is more preferably formed only by water as a solvent.

The main chain backbone of the water-insoluble polymer is not particularly limited, and may be, for example, a vinyl polymer or a condensed polymer (such as an epoxy resin, polyester, polyurethane, polyamide, cellulose, polyether, polyurea, polyimide, or polycarbonate). Among them, a vinyl polymer is preferable.

Preferable examples of the vinyl polymer and the monomer or monomers for forming the vinyl polymer include those described in JP-A Nos. 2001-181549 and 2002-88294. A vinyl polymer may be used which has a dissociative group introduced to a terminal of the polymer chain; the dissociative group may be introduced by radical polymerization of a vinyl monomer using a chain transfer agent, polymerization initiator, or iniferter that has the dissociative group (or a substituent that can be converted to the dissociative group), or by ion polymerization using a compound having the dissociative group (or a substituent that can be converted to the dissociative group) as either of an initiator or a terminator.

Preferable examples of the condensed polymer and the monomers for forming the condensed polymer include those described in JP-A No. 2001-247787.

The particles of the self-dispersible polymer preferably contain a water-insoluble polymer containing a hydrophilic constituent unit and a constituent unit derived from an aromatic group-containing monomer or a cycloaliphatic group-containing monomer as a hydrophobic constituent unit from the viewpoint of self-dispersibility. The hydrophobic constituent unit is more preferably a cycloaliphatic group-containing (meth)acrylate (hereinafter sometimes referred to as "alicyclic(meth)acrylate") from the viewpoint of blocking resistance, rubbing resistance, and dispersion stability.

The alicyclic(meth)acrylate has a structure containing a structural site derived from (meth)acrylic acid and a structural site derived from alcohol and containing at least one substituted or unsubstituted alicyclic hydrocarbon group (cycloaliphatic group) in the structural site derived from alcohol. The alicyclic hydrocarbon group may be the structural site as it is derived from alcohol or may be connected to the structural site derived from alcohol through a linking group.

The "alicyclic(meth)acrylate" refers to methacrylate or acrylate having a alicyclic hydrocarbon group.

The hydrophilic structural unit is not particularly limited as long as it derives from a monomer containing a hydrophilic group. The hydrophilic structural unit may derive from only one type of hydrophilic-group-containing monomer or from two or more types of hydrophilic-group-containing monomer. The hydrophilic group is not particularly limited, and may be a dissociative group or a nonionic hydrophilic group. However, the hydrophilic group contains a hydrophilic structural unit having at least an ethylene oxide chain.

The content of the hydrophilic constituent unit containing at least the ethylene oxide chain (EO chain) is preferably in the range of 1 to 20% by mass, more preferably in the range of 2 to 15% by mass, and still more preferably in the range of 2 to 10% by mass relative to the total mass of the polymer. When the proportion of the EO chain is lower than 1% by mass, a sufficient gloss inhibitory effect is not obtained. When the proportion of the EO chain exceeds 15% by mass, water resistance, blocking resistance, and the like are deteriorated.

Specific examples of the monomers having the EO chain include BLENMER PMA-100, PMA-200, PMA-400, PMA-1000, and AME-400 (trade name, manufactured by NOF Corporation), NK ESTER AM-30G and AM-90G (trade name, manufactured by Shin-Nakamura Chemical Co., Ltd.), and LIGHT ACRYLATE 130A, 130MA, and 041MA (trade name, manufactured by KYOEISHA CHEMICAL Co., Ltd.).

In the present invention, the hydrophilic structural unit preferably contains a hydrophilic group other than the ethylene oxide chain (EO chain). As the hydrophilic group other than the EO chain, a dissociative group is preferable, and more preferably an anionic dissociative group, from the viewpoints of enhancing self-dispersibility and providing stability of the formed emulsion or dispersion state. The dissociative group may be, for example, a carboxyl group, a phosphoric acid group, or a sulfonic acid group. In particular, a carboxyl group is preferable as the dissociative group, in consideration of the fixability of an ink composition containing the self-dispersing polymer particles.

The hydrophilic-group-containing monomer in the present invention is preferably a monomer containing a dissociative group, and more preferably a monomer containing a dissociative group and an ethylenically unsaturated bond, in consideration of self-dispersibility and coagulation property.

The dissociative-group-containing monomer may be, for example, an unsaturated carboxylic acid monomer, an unsaturated sulfonic acid monomer, or an unsaturated phosphoric acid monomer Specific examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Specific examples of the unsaturated sulfonic acid monomer include styrenesulfonic acid, 2-acrylamide-2-methylpropane sulfonic acid, 3-sulfopropyl(meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, acrylic type monomers are more preferable, and acrylic acid and methacrylic acid are still more preferable, in consideration of dispersion stability and ejecting stability.

In the present invention, the acid value of the self-dispersing polymer is preferably 70 mgKOH/g or less from the viewpoint of achieving satisfactory coagulation properties when an ink composition contacts a treatment liquid. The acid value is more preferably from 25 mgKOH/g to 70 mgKOH/g, and still more preferably from 30 mgKOH/g to 70 mgKOH/g. When the acid value of the self-dispersing polymer is 25 mgKOH/g or more, the stability of the self-dispersibility is enhanced.

The self-dispersing polymer particles in the present invention preferably contains a polymer having a carboxyl group, more preferably contains a polymer having a carboxyl group and an acid value of from 25 mgKOH/g to 70 mgKOH/g, and still more preferably contains a polymer having a carboxyl group and an acid value of from 30 mgKOH/g to 70 mgKOH/g, from the viewpoint of self-dispersibility and coagulation speed at the time of contact with the treatment liquid.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the present invention, the aromatic group is preferably an aromatic group derived from an aromatic hydrocarbon, from the viewpoint of improving the stability of the particle shape in an aqueous medium.

The polymerizable group may be a condensation-polymerizable group or an addition-polymerizable group. In the present invention, the polymerizable group is preferably an addition-polymerizable group, and more preferably a group containing an ethylenically unsaturated bond, from the viewpoint of improving the stability of the particle shape in an aqueous medium.

The aromatic-group-containing monomer in the present invention is preferably a monomer having an aromatic group derived from an aromatic hydrocarbon and an ethylenically unsaturated bond. The aromatic-group-containing monomer may be used singly or in combination of two or more thereof.

Examples of the aromatic-group-containing monomer include phenoxyethyl (meth)acrylate, benzyl(meth)acrylate, phenyl(meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one selected from phenoxyethyl(meth)acrylate, benzyl(meth)acrylate, or phenyl(meth)acrylate is more preferable, and phenoxyethyl (meth)acrylate or benzyl(meth)acrylate are still more preferable.

The term "(meth)acrylate" used herein refers to acrylate or methacrylate.

The alicyclic hydrocarbon group is not particularly limited insofar as a cyclic non-aromatic hydrocarbon group is contained. Examples of the alicyclic hydrocarbon group include a monocyclic hydrocarbon group, a dicyclic hydrocarbon group, and a polycyclic hydrocarbon group having three or more rings. Specific examples of the alicyclic hydrocarbon group include cycloalkyl groups, such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[5.2.1.0$^{2,6}$]decanyl group, and a bicyclo[4.3.0] nonane group.

The alicyclic hydrocarbon group may further have a substituent. Examples of the substituent include an alkyl group, an alkenyl group, an aryl group, an aralkyl group, an alkoxy group, a hydroxy group, a primary amino group, a secondary amino group, a tertiary amino group, an alkyl- or aryl-carbonyl group, and a cyano group. The alicyclic hydrocarbon group may further form a fused ring. From the viewpoint of the viscosity and dissolution properties, the alicyclic hydrocarbon group in the invention is preferably such that the number of the carbons of an alicyclic hydrocarbon group part is from 5 to 20.

Preferable examples of the linking group that connects the alicyclic hydrocarbon group and the structural site derived from alcohol include an alkyl group, an alkenyl group, an alkylene group, an aralkyl group, an alkoxy group, a mono- or oligo-ethylene glycol group, and a mono- or oligo-propylene glycol group, each having 1 to 20 carbon atoms.

Examples of the alicyclic(meth)acrylate in the invention are shown below but the invention is not limited to these examples.

Examples of the monocyclic(meth)acrylate include cycloalkyl(meth)acrylates in which the number of the carbons of a cycloalkyl group is 3 to 10, such as cyclopropyl (meth)acrylate, cyclobutyl(meth)acrylate, cyclopentyl(meth) acrylate, cyclohexyl(meth)acrylate, cycloheptyl(meth) acrylate, cyclooctyl(meth)acrylate, cyclononyl(meth) acrylate, and cyclodecyl(meth)acrylate.

Examples of the dicyclic(meth)acrylate include isobornyl (meth)acrylate and norbornyl(meth)acrylate.

Examples of the tricyclic(meth)acrylate include adamantyl (meth)acrylate, dicyclopentanyl(meth)acrylate, and dicyclopentenyloxyethyl(meth)acrylate.

These substances may be used singly or as a mixture of two or more kinds.

Among the above, from the viewpoint of dispersion stability, fixability, and blocking resistance of the self-dispersible polymer particles, at least one of the dicyclic(meth)acrylate or polycyclic(meth)acrylate having three or more rings is preferable and at least one selected from isobornyl(meth) acrylate, adamantyl(meth)acrylate, and dicyclopentanyl (meth)acrylate is more preferable.

In the present invention, the self-dispersing polymer is preferably an acrylic resin containing a structural unit derived from a (meth)acrylate monomer, more preferably a (meth) acrylic resin containing a structural unit derived from an aromatic-group-containing (meth)acrylate monomer or an alicyclic-group-containing (meth)acrylate monomer, and still more preferably a (meth)acrylic monomer containing a structural unit derived from an aromatic-group-containing (meth)acrylate monomer or an alicyclic-group-containing (meth)acrylate monomer at a content of from 10 to 95% by mass. When the content of the aromatic-group-containing (meth)acrylate monomer or an alicyclic-group-containing (meth)acrylate monomer is from 10 to 95% by mass, stability of self-emulsification or dispersion state improves, and, further, an increase in the ink viscosity can be suppressed.

In the present invention, the content of the aromatic-group-containing (meth)acrylate monomer or an alicyclic-group-containing (meth)acrylate monomer is more preferably from 15 to 90% by mass, still more preferably from 15 to 80% by mass, and particularly preferably from 25 to 70% by mass, from the viewpoints of improving stability of the self-dispersing state, stabilizing the particle shape in an aqueous medium through hydrophobic interaction between aromatic rings or between alicyclic hydrocarbons, and reducing the amount of water-soluble components by imparting appropriate hydrophobicity to the particles.

In the present invention, the self-dispersing polymer may include, for example, a structural unit derived from an aromatic-group-containing monomer or cycloaliphatic-group-containing monomer and a structural unit derived from a dissociative-group-containing monomer. The self-dispersing polymer may further include another structural unit, as necessary.

The monomer for forming another structural unit is not particularly limited as long as the monomer is copolymerizable with the aromatic-group-containing monomer or cycloaliphatic-group-containing monomer and the dissociative-group-containing monomer. In particular, an alkyl-group-containing monomer is preferable from the viewpoint of flexibility of the polymer skeleton and ease in regulating the glass transition temperature (Tg).

Examples of the alkyl-group-containing monomer include (meth)acrylic ester monomers such as alkyl(meth)acrylates (such as methyl(meth)acrylate, ethyl(meth)acrylate, isopropyl(meth)acrylate, n-propyl(meth)acrylate, n-butyl(meth) acrylate, isobutyl(meth)acrylate, t-butyl(meth)acrylate, hexyl(meth)acrylate, and ethylhexyl(meth)acrylate), ethylenic unsaturated monomers each having a hydroxyl group (such as hydroxymethyl(meth)acrylate, 2-hydroxyethyl (meth)acrylate, 2-hydroxypropyl(meth)acrylate, 4-hydroxybutyl(meth)acrylate, hydroxypentyl(meth)acrylate, and hydroxyhexyl(meth)acrylate), and dialkylaminoalkyl(meth) acrylates such as dimethylaminoethyl(meth)acrylate; and (meth)acrylamide monomers such as N-hydroxyalkyl(meth) acrylamides (such as N-hydroxymethyl(meth)acrylamide, N-hydroxyethyl(meth)acrylamide, and N-hydroxybutyl (meth)acrylamide) and N-alkoxyalkyl(meth)acrylamides (such as N-methoxymethyl(meth)acrylamide, N-ethoxymethyl(meth)acrylamide, N-(n-,iso)butoxymethyl(meth)acrylamide, N-methoxyethyl(meth)acrylamide, N-ethoxyethyl (meth)acrylamide, and N-(n-,iso)butoxyethyl(meth) acrylamide).

The molecular weight of the water-insoluble polymer forming the self-dispersing polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble component can be effectively set to a small amount. When the weight average molecular weight is 200,000 or less, the stability of the self-dispersibility can be improved.

The weight average molecular weight is measured with a gel permeation chromatography (GPC). As a GPC instrument, HLC-8220GPC manufactured by Tosoh Corporation is used; the columns (three in number) to be used are TSKgeL Super HZM-H, TSKgeL SuperHZ4000, and TSKgeL SuperHZ2000 (all manufactured by Tosoh Corporation, 4.6 mm ID×15 cm); and THF (tetrahydrofuran) is used as an eluent.

When the water-insoluble polymer forming the self-dispersing polymer particles contains a structural unit derived from an aromatic-group-containing (meth)acrylate monomer or cycloaliphatic-group-containing monomer (preferably a structural unit derived from phenoxyethyl(meth)acrylate and/or a structural unit derived from benzyl(meth)acrylate, or isobornyl(meth)acrylate and/or adamantyl(meth)acrylate and/or dicyclopentanyl(meth)acrylate), the copolymerization ratio of the structural unit derived from an aromatic-group-containing (meth)acrylate monomer or cycloaliphatic-group-containing monomer is preferably from 15 to 80% by mass with respect to the total mass of the self-dispersing polymer particles, from the viewpoint of regulating the hydrophilicity/hydrophobicity of the polymer.

The water-insoluble polymer, from the viewpoint of regulating the hydrophilicity/hydrophobicity of the polymer, preferably includes a structural unit derived from an aromatic-group-containing (meth)acrylate monomer or cycloaliphatic-group-containing monomer at a copolymerization ratio of from 15 to 80% by mass, a structural unit derived from a carboxyl-group-containing monomer, and a structural unit derived from an alkyl-group-containing monomer (preferably a structural unit derived from an alkyl(meth)acrylate), and more preferably includes a structural unit derived from phenoxyethyl(meth)acrylate and/or a structural unit derived from benzyl(meth)acrylate or a structural unit derived from isobornyl(meth)acrylate and/or adamantyl(meth)acrylate and/or dicyclopentanyl(meth)acrylate at a total copolymerization ratio of from 15 to 80% by mass, a structural unit derived from a carboxyl-group-containing monomer, and a structural unit derived from an alkyl-group-containing monomer (preferably a structural unit derived from (meth)acrylic ester of an alkyl having 1 to 4 carbon atoms); further it is preferable that the acid value of the water-insoluble polymer is from 25 to 100 (mg KOH/g) and the weight average molecular weight of the water-insoluble polymer is from 3,000 to 200,000, and it is more preferable that the acid value is from 25 to 95 (mg KOH/g) and the weight average molecular weight is from 5,000 to 150,000.

Examples of the water-insoluble polymer forming the self-dispersing polymer particles (exemplary compounds B-01 to B-19, C-1 to C-5) are shown below. However, the present invention is not limited thereto. The numbers in the parentheses indicate mass ratios of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/acrylic acid copolymer (May 48, 1940/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)
C-1: methyl methacrylate/isobornyl(meth)acrylate/acrylic acid copolymer (20/72/8, glass transition temperature: 180° C.)
C-2: methyl methacrylate/isobornyl(meth)acrylate/acrylic acid copolymer (40/52/8, glass transition temperature: 160° C.)
C-3: methyl methacrylate/isobornyl(meth)acrylate/acrylic acid copolymer (10/88/2, glass transition temperature: 158° C.)
C-4: methyl methacrylate/isobornyl(meth)acrylate/dicyclopentanyl(meth)acrylate/acrylic acid copolymer (20/62/10/8, glass transition temperature: 170° C.)
C-5: methyl methacrylate/dicyclopentanyl(meth)acrylate/acrylic acid copolymer (20/72/8, glass transition temperature: 160° C.)

The method of producing the water-insoluble polymer forming the self-dispersing polymer particles in the present invention is not particularly limited, and may be a method including performing emulsion polymerization in the presence of a polymerizable surfactant so as to covalently couple the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and ejection stability of an ink composition containing the self-dispersing polymer particles.

From the viewpoint of aggregation speed, the self-dispersing polymer in the present invention preferably includes a polymer synthesized in an organic solvent, wherein the polymer has carboxyl groups, all or some of the carboxyl groups of the polymer are neutralized (to give an acid value of preferably from 25 to 50), and the polymer is prepared in the form of a polymer dispersion in which water constitutes the continuous phase. In other words, the production of the self-dispersing polymer particles in the present invention preferably includes a step of synthesizing a polymer in an organic solvent and a dispersing step of forming an aqueous dispersion in which at least some of the carboxyl groups of the polymer are neutralized.

The dispersion step preferably includes the following sub-steps (1) and (2):

Sub-step (1): a step of stirring a mixture containing a polymer (water-insoluble polymer), an organic solvent, a neutralizing agent, and an aqueous medium Sub-step (2): a step of removing the organic solvent from the mixture The sub-step (1) is preferably a process in which the polymer (water-insoluble polymer) is dissolved in the organic solvent, and then the neutralizing agent and the aqueous medium are gradually added to the polymer solution, followed by mixing and stirring to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the mixture is not particularly limited, and may be a method using a generally-used mixing and stirring apparatus and/or, if necessary, a disperser such as an ultrasonic disperser or a high-pressure homogenizer.

Preferable examples of the organic solvent described above include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol together with methyl ethyl ketone for the purpose of making the polarity change milder at the time of phase inversion from an oil phase to an aqueous phase. The combination of these solvents makes it possible to obtain self-dispersing polymer particles having a very small particle diameter that are free from aggregation precipitation or adhesion between the particles and that have high dispersion stability.

The neutralizing agent is used to neutralize all or some of the dissociative groups of the polymer so as to allow the self-dispersing polymer to get into a stable emulsion or dispersion state in water. When the self-dispersing polymer in the present invention has an anionic dissociative group (e.g., a carboxyl group) as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of dispersion stability in water of the self-dispersing polymer particles used in the present invention.

The amount of the basic compound to be used is preferably from 5 to 120 mol %, more preferably from 10 to 110 mol %, and still more preferably from 15 to 100 mol %, with respect to 100 mol % of the dissociative group. When the amount of the basic compound is 15 mol % or more, an effect of stabilizing the dispersion of the particles in water can be especially enhanced. When the amount of the basic compound is 100 mol % or less, an effect of decreasing the amount of the water-soluble component can be especially enhanced.

In the sub-step (2), the organic solvent is removed, by distillation, from the dispersion obtained in the sub-step (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The average particle diameter of the polymer particles may be controlled in the range of 70 nm or less in terms of volume average particle diameter. When the volume average particle diameter is more than 70 nm, the image surface may become non-uniform and it may be difficult to prevent reduction in gloss. Especially, from the viewpoint of enhancing gloss, the volume average particle diameter is preferably in the range of from 1 nm to 70 nm, more preferably in the range of from 2 nm to 60 nm, still more preferably from 2 nm to 30 nm. When the volume average particle diameter is 1 nm or more, and further 2 nm or more, the suitability for production is improved.

The particle size distribution of the self-dispersing polymer particles is not particularly limited, and may be a broad particle size distribution or a mono-dispersed particle size distribution. It is possible to use a mixture of two or more types of water-insoluble particles.

The average particle diameter and particle size distribution of the self-dispersing polymer particles is obtained by measuring the volume average diameters of the particles by a dynamic light scattering method using NANOTRAC particle size analyzer UPA-EX150 manufactured by Nikkiso Co., Ltd.

The glass transition temperature (Tg) of the self-dispersible polymer in the invention is preferably 70° C. or higher. When the glass transition temperature (Tg) is lower than 70° C., the image surface may become non-uniform, and it may be difficult to prevent reduction in gloss of the image when a solid image or the like is formed. In particular, in terms of enhancement of the effect of suppressing reduction in gloss, the Tg is more preferably 80° C. or higher and still more preferably 100° C. or higher. The upper limit of the glass transition temperature (Tg) is not particularly limited and the Tg is preferably 180° C. or less.

It is possible to use either one type of self-dispersing polymer particles or a mixture of two or more types of self-dispersing polymer particles.

The content of the self-dispersing polymer particles in the ink composition is preferably from 1 to 30% by mass, and more preferably from 5 to 15% by mass, with respect to the ink composition, from the viewpoint of aggregation speed, image gloss, and the like.

In the ink composition, the content ratio of pigment to self-dispersing polymer particles (for example, water-insoluble pigment particles/self-dispersing polymer particles) is preferably in the range of from 1/0.5 to 1/10, and more preferably in the range of from 1/1 to 1/4, from the viewpoint of, for example, rubbing resistance of an image.

Explanation has been made above, taking the self-dispersible polymer particles as a preferable example of the polymer particles. However, the polymer particles are not limited to the self-dispersible polymer particles and other polymer particles can be used insofar as the following conditions are satisfied: Glass transition temperature (Tg)≧70° C. and Volume average particle size≦70 nm. For example, polymer particles, such as generally known emulsion polymerization latex, can also be preferably used by adjusting the constituent monomer, emulsifier, dispersion conditions, and the like.

(Polymerizable Compound)

In the present invention, the ink composition includes at least one water-soluble polymerizable compound having an ethylene oxide chain [$(C_2H_4O)_n$ chain (n represents a positive integer; the structure unit originated from polyethylene glycol] that undergoes polymerization when irradiated with an active energy radiation. The polymerizable compound is used together with the pigment and polymer particles described above, and, when the ink composition is contacted with the treatment liquid and coagulated, the polymerizable compound is incorporated into a space among particles, and an image is strengthened by subsequent curing through polymerization.

ionic polymerizable compound, and the polymerizable compound having water-solubility of at least 10% by mass (more preferably water-solubility of at least 15% by mass) is preferable.

Examples of the nonionic polymerizable monomer include a polymerizable compound such as (meth)acrylic monomers.

Examples of the (meth)acrylic monomer include a (meth)acrylic ester of a polyhydric alcohol, a (meth)acrylic ester of a glycidiyl ether of a polyhydric alcohol, a (meth)acrylic ester of polyethylene glycol, a (meth)acrylic ester of an ethylene oxide adduct of a polyhydric alcohol, and a UV-curable monomer or oligomer such as a reaction product between a polybasic acid anhydride and a hydroxyl-group-containing (meth)acrylic ester.

The polyhydric alcohol may have a chain therein that is elongated by an ethylene oxide chain formed by addition of ethylene oxide.

Specific examples (nonionic compounds 1 to 4) of the nonionic polymerizable compound are shown below. However, the present invention is not intended to be limited thereto.

Nonionic Compound 1

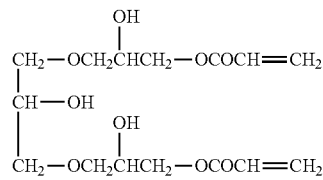

Nonionic Compound 2

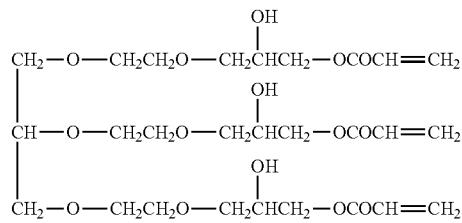

Nonionic Compound 3

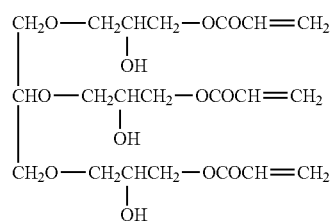

Nonionic Compound 4

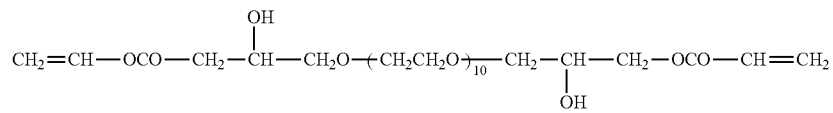

"Water-soluble" as used herein refers to an ability to dissolve in water at a concentration that is equal to or more than a certain level, and may refer to an ability to dissolve in an aqueous ink (preferably uniformly). The dissolution in an ink, which is preferably uniform dissolution, may be achieved by an increase in solubility caused by addition of the below-mentioned water-soluble organic solvent. Specifically, "water-soluble" preferably refers to a water-solubility of at least 10% by mass, and more preferably a water-solubility of at least 15% by mass.

From the viewpoint of avoiding inhibition of a reaction between a coagulant and the pigment or the polymer particles, the polymerizable compound is preferably a nonionic or cat- An acrylic ester having two or more acryloyl groups in a molecule thereof that may be derived from a compound having multiple hydroxyl groups may be also used. Examples of the compound having multiple hydroxyl groups include: a condensate of a glycol; an oligoether; and an oligoester.

Examples of the nonionic polymerizable compound further include an acrylic or methacrylic ester of a polyol having two or more hydroxyl groups such as monosaccharide or disaccharide; and a (meth)acrylic ester of triethanolamine, diethanolamine, trishydroxyaminomethane, trishydroxyaminoethane, or the like. Specific examples thereof. (Nonionic Compounds (a) to (k)) are shown below. However, the present invention is not intended to be limited thereto.

(a)
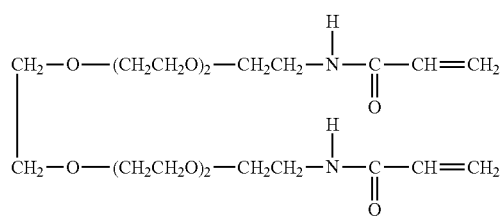
(b)
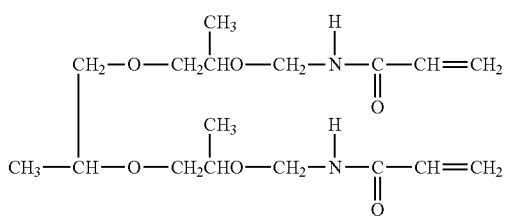
(c)
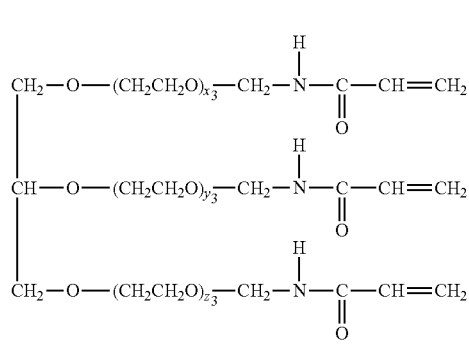
$x_3 + y_3 + z_3 = 6$
(d)
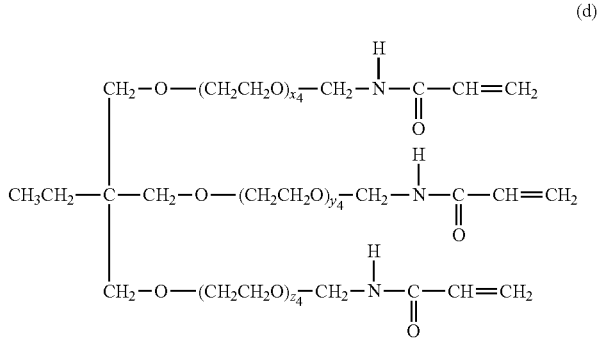
$x_4 + y_4 + z_4 = 9$
(e)
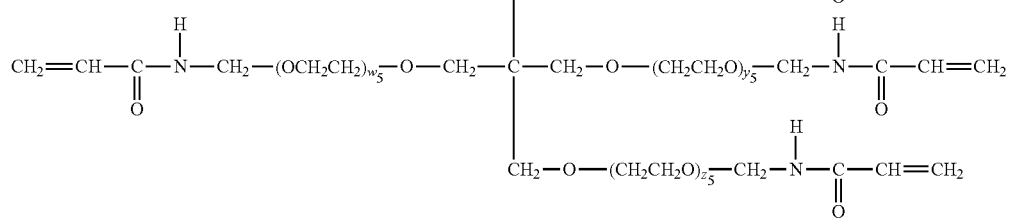
$w_5 + x_5 + y_5 + z_5 = 6$
(f)
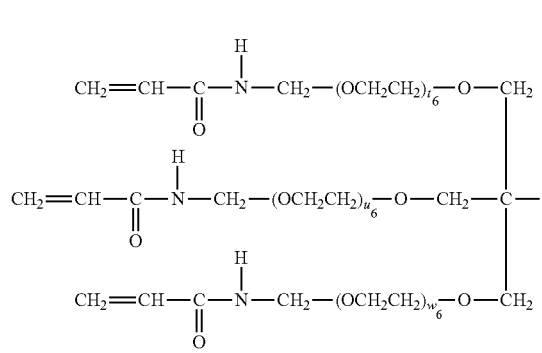
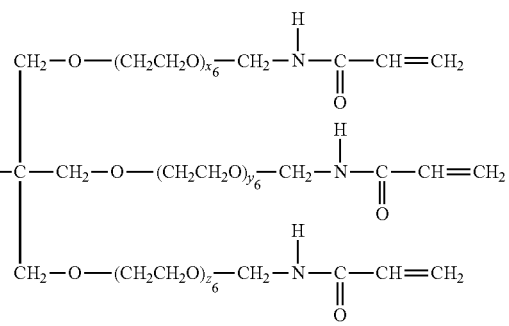
$t_6 + u_6 + w_6 + x_6 + y_6 + z_6 = 12$

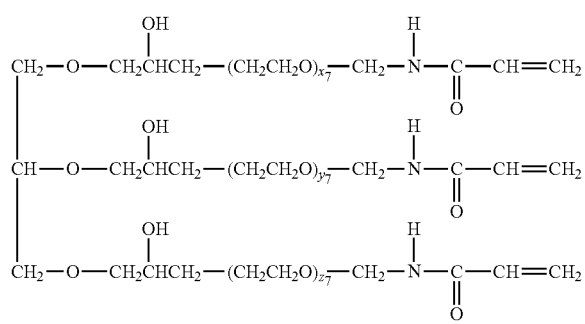

(g)

$x_7 + y_7 + z_7 = 3$

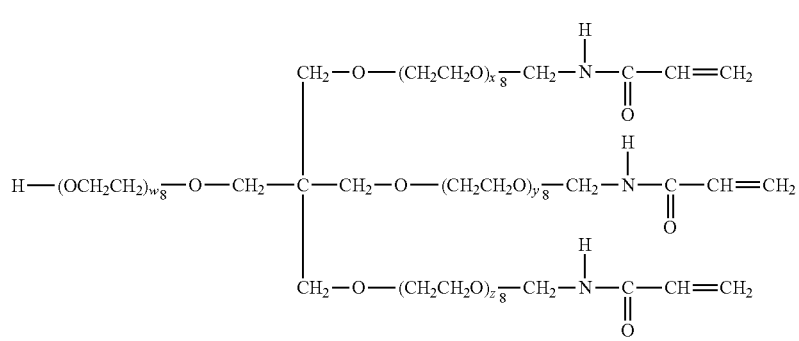

(h)

$w_8 + x_8 + y_8 + z_8$

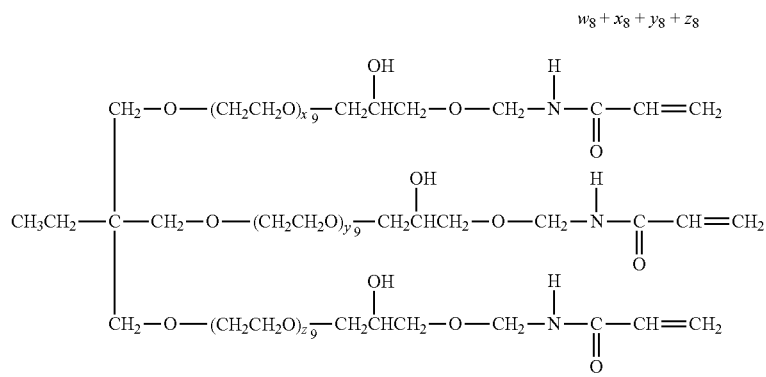

(i)

$x_9 + y_9 + z_9 = 3$

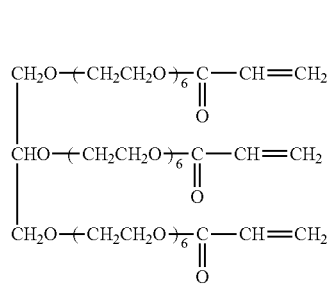

(j)

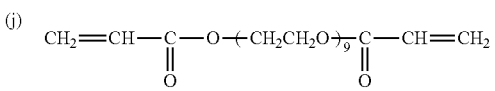

(k)

The cationic polymerizable compound is a compound having a cation group and a polymerizable group, such as an unsaturated double bond and preferable examples include epoxy monomers and oxetane monomers. When the cationic polymerizable compound is contained, the cationic properties of the ink composition increase due to the fact that the cation group is contained and color mixture when anionic inks are used is more effectively prevented.

Examples of the cationic polymerizable compound include N,N-dimethylaminoethyl methacrylate, N,N-dimethylaminoethyl acrylate, N,N-dimethylaminopropyl methacrylate, N,N-dimethylaminopropyl acrylate, N,N-dimethylamino acrylamide, N,N-dimethylamino methacrylamide, N,N-dimethylaminoethyl acrylamide, N,N-dimethylaminoethyl methacrylamide, N,N-dimethylaminopropyl acrylamide, N,N-dimethylaminopropyl methacrylamide, and quaternary compounds thereof.

Examples of the epoxy monomer include a glycidyl ether of a polyhydric alcohol, a glycidyl ester, and an aliphatic cyclic epoxide.

Examples of the cationic polymerizable compound include those having the following structures.

Structure 1
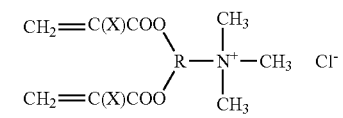

Structure 2
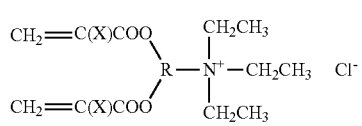

Structure 3
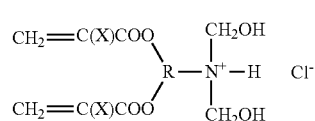

Structure 4
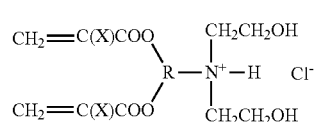

Structure 5
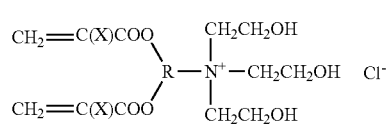

Structure 6
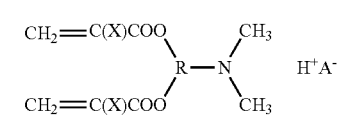

Structure 7
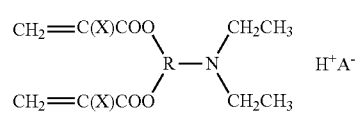

Structure 8
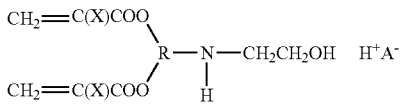

Structure 9
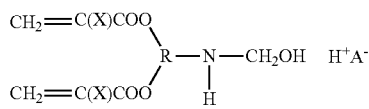

Structure 10
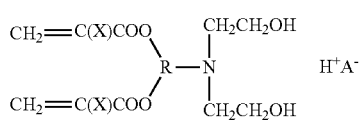

Structure 11
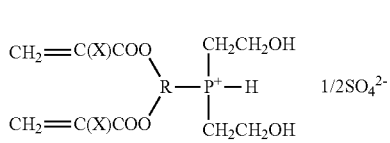

Structure 12
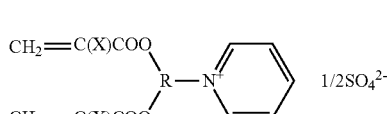

In the above structures, R represents a polyol residue; X represents H or $CH_3$; $A^-$ represents $Cl^-$, $HSO_3^-$, or $CH_3COO^-$. Examples of a compound used for introducing the polyol include glycerine, 1,2,4-butanetriol, 1,2,5-pentanetriol, 1,2,6-hexanetriol, trimethylolpropane, trimethylolmethane, trimethylolethane, pentaerhythritol, bisphenol A, alicyclic bisphenol A, and condensates thereof.

Specific examples of the polymerizable compound having a cationic group include those shown below (Cationic Compounds 1 to 11).

Cationic Compound 1
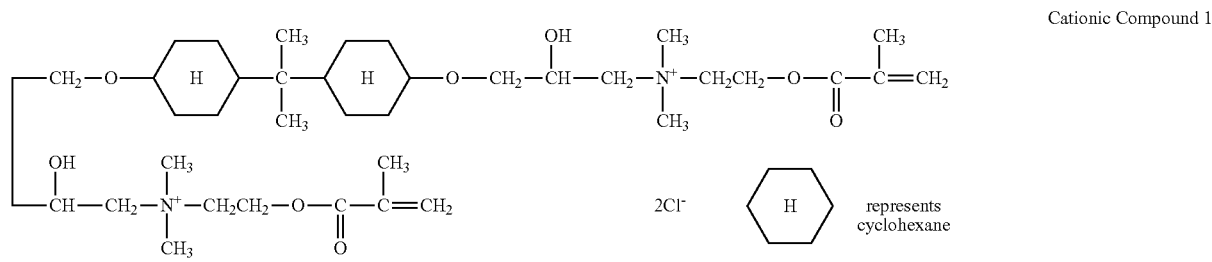

Cationic Compound 2
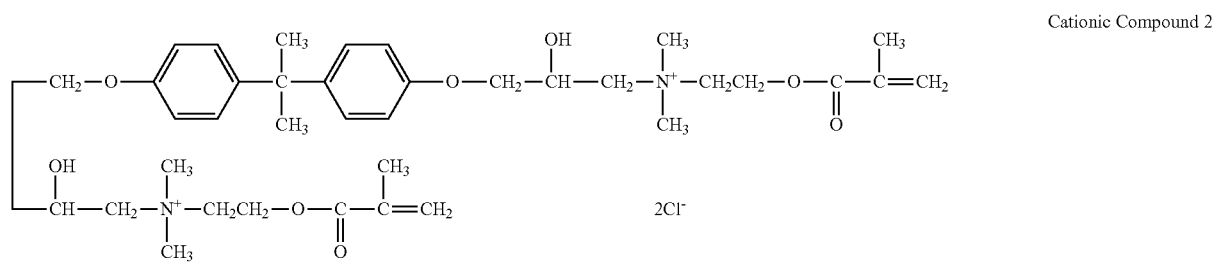

-continued
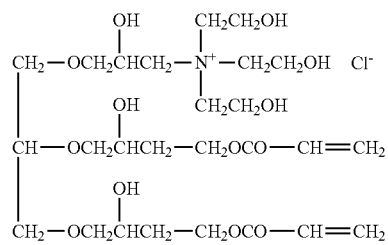
Cationic Compound 3
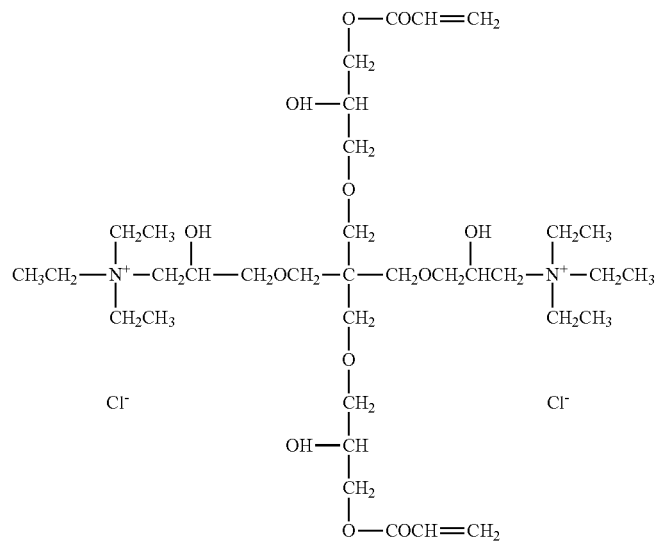
Cationic Compound 4
Cationic Compound 5
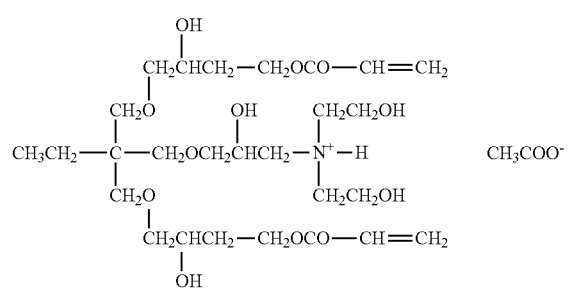
Cationic Compound 6
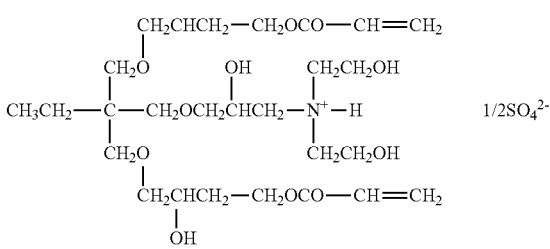
Cationic Compound 7
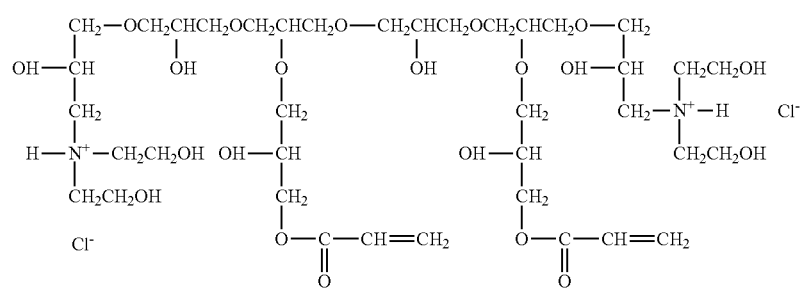

Cationic Compound 8

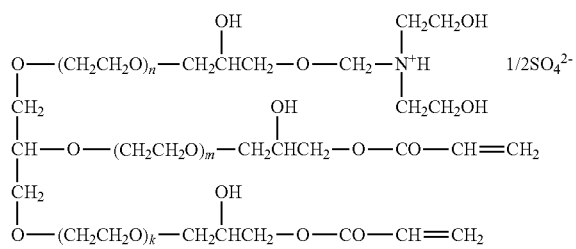

$n + m + k = 15$

Cationic Compound 9

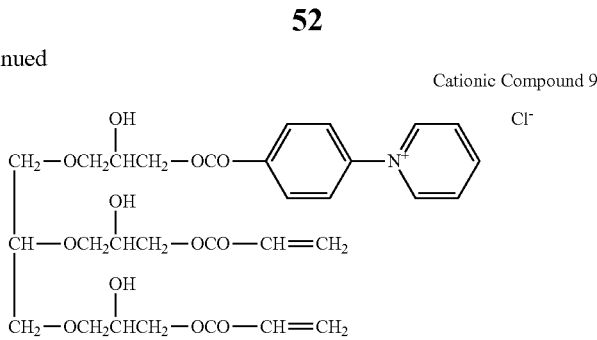

Cationic Compound 10

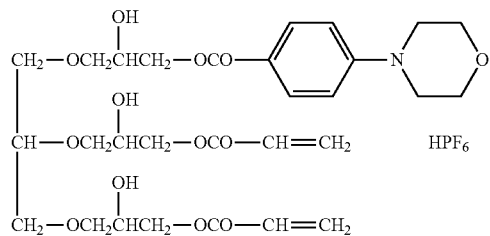

Cationic Compound 11

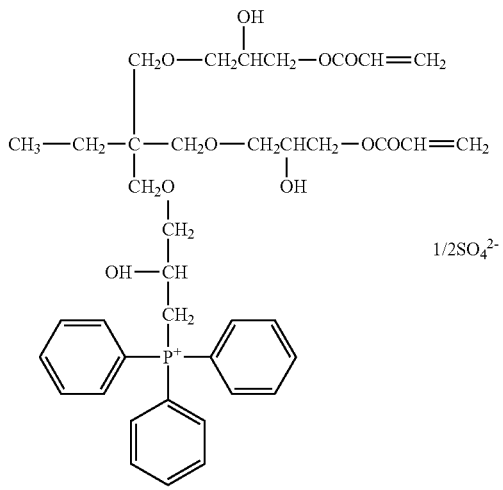

In the present invention, the polymerizable compound is preferably a multifunctional monomer, and more preferably a difunctional to hexafunctional monomer, from the viewpoint of increasing rubbing resistance. From the viewpoint of achieving both of satisfactory solubility and satisfactory rubbing resistance, the polymerizable compound is preferably a difunctional to tetrafunctional monomer.

The ink composition may include the polymerizable compound singly or in combination of two or more thereof.

The content of the polymerizable compound in the ink composition is preferably from 30 to 300% by mass, and more preferably from 50 to 200% by mass, with respect to the total of the solid contents of pigment and self-dispersing polymer particles. When the content of the polymerizable compound is 30% by mass or more, image strength is improved and rubbing resistance of an image is excellent. A content of the polymerizable compound of 300% by mass or less is preferable in terms of pile height.

Initiator

In the present invention, the ink composition may include at least one initiator that initiates polymerization of the polymerizable compound when irradiated with an active energy radiation. The below-mentioned treatment liquid may or may not include the initiator. The photopolymerization initiator may be used singly or in a mixture of two or more thereof. The photopolymerization initiator may be used together with a sensitizer.

The initiator may be appropriately selected from compounds that can initiate a polymerization reaction when irradiated with an active energy radiation, and examples thereof include an initiator, such as a photopolymerization initiator, that generates an active species (for example, a radical, an acid, or a base) when irradiated with a radiation or light or an electron beam.

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bisdiethylaminobenzophenone, Michler's ketone, benzil, benzoine, benzoin methyl ether, benzoin ethyl ether, benzoin isopropyl ether, benzoin n-propyl ether, benzoin isobutyl ether, benzoin n-butyl ether, benzil dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propane-1-one, 2-hydroxy-2-methyl-1-phenyl-1-one, 1-(4-isopropylphenyl)-2-hydroxy-2-methylpropane-1-one, and methyl benzoyl formate. Further examples include an aromatic diazonium salt, an aromatic halonium salt, an aromatic sulfonium salt, and a metallocene compound, such as triphenylsulfonium hexafluorophosphate or diphenyliodonium hexafluoroantimonate.

When the ink composition includes an initiator, the content of the initiator in the ink composition may be from 1 to 40% by mass, and more preferably from 5 to 30% by mass, with respect to the amount of the polymerizable compound. When the content of the initiator is 1% by mass or more, the rubbing resistance of an image is further improved, which is preferable in high-speed recording. A content of the initiator of 40% by mass or less is preferable in terms of ejection stability.

Examples of the sensitizer include an amine-containing compound such as an aliphatic amine, an amine having an aromatic group, or piperidine; a urea such as an allyl-containing urea or o-tolylthiourea; a sulfur-containing compound such as sodium diethyl dithiophosphate or a soluble salt of an aromatic sulfinic acid; a nitrile-containing compound such as N,N-disubstituted p-aminobenzonitrile; a phosphorus-containing compound such as tri-n-butylphosphine or sodium diethyl dithiophosphate; a nitrogen-containing compound such as Michler's ketone, a N-nitrosohydroxylamine derivative, an oxazolidine compound, a tetrahydro-1,3-oxazine compound, or a condensate of a diamine with formaldehyde or acetoaldehyde; a chlorine-containing compound such as carbon tetrachloride or hexachloroethane; a high-molecular-weight amine that is a reaction product of an epoxy resin and an amine; and triethanolamine triacrylate.

The sensitizer may be contained so far as the effects of the present invention are not impaired.

Water-Soluble Organic Solvent

The ink composition used in the present invention may include at least one kind of water-soluble organic solvent. By including the water-soluble organic solvent, effects of drying prevention, moistening, promoting penetration or the like may be obtained. In order to prevent drying, the solvent may be used as a anti-drying agent for preventing nozzle clogging due to aggregation of ink that has attached and dried at an ejection port of a jetting nozzle. In terms of drying prevention or moistening, a water-soluble organic solvent having a lower vapor pressure than that of water is preferably used. In terms of promoting penetration, the solvent may be used as a penetration promoter for improving the penetration ability of ink into a paper.

As an anti-drying agent, the water-soluble organic solvent preferably has a lower vapor pressure than that of water. Examples of such a solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether and triethylene glycol monobutyl ether; heterocyclic compounds such as 2-pyrrolidone, N-methyl-2-pyrrolidone, 1,3-dimethyl-2-imidazolidinone and N-ethyl morpholine; sulfur-containing compounds such as sulfolane, dimethyl sulfoxide and 3-sulfolene; polyfunctional compounds such as diacetone alcohol and diethanol amine; and urea derivatives.

Among these, polyhydric alcohols such as glycerin and diethylene glycol are preferable as anti-drying agents.

The anti-drying agent may be used singly or in combination of two or more thereof. The content of anti-drying agent in the ink composition is preferably from 10 to 50 mass %.

As the penetration promoter, the water-soluble organic solvent is favorably used in order to promote the penetration of ink composition into a recording medium (such as printing paper). Examples of such a solvent include alcohols such as ethanol, isopropanol, butanol, diethylene glycol monobutyl ether, triethylene glycol monobutyl ether and 1,2-hexanediol, sodium lauryl sulfate, sodium oleate, and nonionic surfactants.

The penetration promoter may be used singly or in combination of two or more thereof. The content of penetration promoter in the ink composition is preferably from 5 to 30 mass %. The use amount of the penetration promoter is preferably in a range in which image bleeding or print through is not caused.

The water-soluble organic solvent may be used also for adjusting the viscosity of the ink composition. Examples of the water-soluble organic solvent that may be used as a viscosity adjuster include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethyelene glycol, propylene glycol, dipropylene glycol, polypropylene glycol, butylene glycol, hexanediol, pentanediol, glycerin, hexanetriol and thiodiglycol; glycol derivatives such as ethylene glycol monomethyl ether, ethylene glycol monoethyl ether, ethyelene glycol monobutyl ether, diethyelene glycol monomethyl ether, diethylene glycol monobutyl ether, propylene glycol monomethyl ether, propylene glycol monobutyl ether, dipropylene glycol monomethyl ether, triethyelene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethylene imine and tetramethyl propylene diamine; and other polar solvents such as formamide, N,N-dimethyl formamide, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. Any of these solvents may be used singly or in combination of two or more thereof.

Water

The ink composition includes water, and the content of water in the ink composition is not particularly limited. The content of water in the ink composition is preferably from 10 to 99% by mass, more preferably from 30 to 80% by mass, and still more preferably from 50 to 70% by mass.

Other Additives

The ink composition used in the present invention may further include other additives than the aforementioned components, such as known additives including a polymerization inhibitor, an anti-drying agent (moistener), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent and a chelating agent. When these additives are added to the ink composition, they are usually directly added to the ink composition. When a dispersion of an oil dye is used, these additives are usually added to the dispersion after the preparation of the dye dispersed. However, these additives may be added to an oil phase or aqueous phase during the preparation of the dye dispersion.

The use of the UV absorber may improve the storability of an image, and examples of the UV absorber include: benzotriazole compounds such as those described in JP-A Nos. 58-185677, 61-190537, 2-782, 5-197075 and 9-34057; benzophenone compounds such as those described in JP-A Nos. 46-2784, and 5-194483 and U.S. Pat. No. 3,214,463; cinnamic compounds such as those described in Japanese Patent Nos. 48-30492, and 56-21141 and JP-A No. 10-88106; triazine compounds such as those described in JP-A No. 4-298503, 8-53427, 8-239368, 10-182621 and Japanese Patent Application National phase Publication No. 8-501291; compounds described in Research Disclosure No. 24239; and so-called fluorescent brighteners that emit fluorescent light upon absorption of UV rays, such as stilbene compounds and benzoxazole compounds.

The anti-fading agent may be used for improving the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes. More specifically, examples of usable antifading agents include those described in the patents cited in Research Disclosure No. 17643, Section VII, Items I to J; Research Disclosure No. 15162; No. 18716, page 650, left column; Research Disclosure No. 36544, page 527; No. 307105, page 872; Research Disclosure No. 15162; and compounds within the scope of the chemical formulae and examples of representative compounds described in pages 127 to 137 of JP-A No. 62-215272.

Examples of the mildew-proofing agents include sodium dehydroacetate, sodium benzoate, sodium pyridinethion-1-oxide, ethyl p-hydroxybenzoate, 1,2-benzoisothiazolin-3-one, and salts thereof. The content of the mildew-proofing agent is preferably from 0.02 to 1.00 mass % with respect to the ink composition.

Examples of the pH adjuster include a neutralizer such as an organic base or an inorganic alkali. The pH adjuster may improve the storability of the ink composition. The pH adjuster is preferably added at such an amount that the pH of the ink composition becomes from 6 to 10, more preferably from 7 to 10.

Example of the surface-tension controller include nonionic surfactants, cationic surfactants, anionic surfactants, and betaine surfactants.

The surface-tension controller is preferably added in such an amount that the surface tension of the ink composition is from 20 to 60 mN/m, more preferably from 20 to 45 mN/m, and further preferably from 25 to 40 mN/m. When the surface-tension controller is added in an amount in the above range, the ink composition may be spotted in a favorable manner using an inkjet method.

Examples of the surfactants include, as hydrocarbon surfactants, anionic surfactants such as fatty acid salts, alkyl sulfuric acid ester salts, alkyl benzene sulfonates, alkyl naphthalene sulfonates, dialkyl sulfosucciniates, alkyl phosphoric acid salts, formalin condensates of naphthalene sulfonic acid and polyoxyethylene alkyl acid ester salts; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Further, acetylene-type polyoxyethyleneoxide surfactants, such as SURFYNOL series (trade name, manufactured by Air Products & Chemicals, Inc.), and amine oxide-type amphoteric surfactants such as N,N-dimethyl-N-alkylamine oxide are also favorably used.

Moreover, compounds described as a surfactant in JP-A No. 59-157636, pp. 37 to 38 and Research Disclosure No. 308119 (1989) are also applicable.

The anti-abrasion properties may be improved by using fluorine (fluoroalkyl) surfactants, silicone surfactants or the like, such as those described in JP-A No. 2003-322926, 2004-325707 and 2004-309806.

The aforementioned surface-tension controller may also be used as an antifoam agent, and fluorine compounds, silicone compounds, chelate compounds such as EDTA are also applicable.

Treatment Liquid

The treatment liquid includes at least a coagulant that coagulates the aforementioned components of the ink composition, and may further include one or more other components. Since the treatment liquid is used with the ink composition, inkjet recording can be performed at a higher speed, and an image showing excellent printing properties with high density and high resolution (including reproducibility of thin lines and minute portions) is obtained even when recording is performed at high speed.

The coagulant may be a compound that can change the pH value of the ink composition, a polyvalent metal salt, or a polymer having a quaternary amine or a tertiary amine such as polyallylamines. In the present invention, a compound that can change the pH value of the ink composition is preferable, and a compound that can decrease the pH value of the ink composition is more preferable, from the viewpoint of coagulation properties of the ink composition.

The compound that can decrease the pH value of the ink composition may be an acidic substance. Suitable examples of the acidic substance include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, and derivatives thereof, and salts thereof.

The acid substance may be used singly, or in combination of two or more thereof.

In the present invention, when the treatment liquid includes an acidic substance, the pH value of the treatment liquid at 25° C. is preferably 6 or less, and more preferably 4 or less. In particular, the pH value of the treatment liquid at 25° C. is preferably from 1 to 4, and particularly preferably from 1 to 3. In such a case, the pH value of the ink composition at 25° C. is preferably 7.5 or more, and more preferably 8.0 or more.

In particular, it is preferable that the pH value of the ink composition at 25° C. is 8.0 or more and the pH value of the treatment liquid at 25° C. is from 0.5 to 4, from the viewpoint of image density, resolution, and higher-speed inkjet recording.

In the present invention, the coagulant is preferably an acidic substance having high solubility with respect to water, and is preferably an organic acid from the viewpoints of increasing coagulation properties and immobilizing the entire ink. The coagulant is more preferably a divalent or higher-valent organic acid, and still more preferably a divalent or trivalent acidic substance. The divalent or higher-valent organic acid is preferably an organic acid having a first pKa of 3.5 or less, and more preferably an organic acid having a first pKa of 3.0 or less. Examples thereof include phosphoric acid, oxalic acid, malonic acid, and citric acid.

Examples of the polyvalent metal salts include salts of an alkaline earth metal of Group 2 of the periodic table (e.g., magnesium and calcium), a transition metal of Group 3 of the periodic table (e.g., lanthanide), a cation of Group 13 of the periodic table (e.g., aluminum), lanthanides (e.g., neodymium), and the like. Preferable examples of the salts of these metals include carboxylic acid salts (formic acid salt, acetic acid salt, benzoic acid, and the like), nitric acid salt, chlorides, and thiocyanic acid salt. Among the above, calcium salts or magnesium salts of carboxylic acids (formic acid, acetic acid, benzoic acid salt, and the like), calcium salts or magnesium salts of nitric acid, calcium chlorides, magnesium chlorides, and calcium salts or magnesium salts of thiocyanic acid are preferable.

The coagulant may be used singly, or in combination of two or more thereof.

The content of the coagulant, which coagulates the ink composition, in the treatment liquid is preferably from 1 to 50% by mass, more preferably from 3 to 45% by mass, and still more preferably from 5 to 40% by mass.

The treatment liquid may include other additives as additional components, as long as the effects of the present invention are not impaired. Examples of other additives include known additives, such as an anti-drying agent (moistening agent), an anti-fading agent, an emulsion stabilizer, a penetration enhancing agent, a UV absorber, an antiseptic agent, an mildew-proofing agent, a pH adjuster, a surface-tension controller, an antifoam agent, a viscosity adjuster, a dispersant, a dispersion stabilizer, an antirust agent, and a chelating agent.

As an ink set according to the present invention, the following combination is preferable:
an ink composition including:
(i) a water-dispersible pigment covered with a polymer dispersant having a carboxyl group and an acid value of 100 mgKOH/g or less;
(ii) particles of a self-dispersing polymer having an acid value of 100 mgKOH/g or less, a glass transition temperature (Tg) of 100° C. or more, and a volume-average particle size of 50 nm or less; and
(iii) a trifunctional, tetrafunctional, or pentafunctional, non-ionic or cationic water-soluble monomer as a polymerizable compound; and
a treatment liquid including an organic acid.

The following combination is more preferable:
an ink composition including (i) a water-dispersible pigment covered with a polymer dispersant having a carboxyl group and an acid value of from 30 mgKOH/g to 80 mgKOH/g; (ii) particles of a self-dispersing polymer having an acid value of from 25 mgKOH/g to 50 mgKOH/g, a glass transition temperature (Tg) of 100° C. or more, and a volume-average particle size of from 2 to 60 nm (more preferably from 2 to 30 nm); and (iii) a trifunctional or tetrafunctional, nonionic water-soluble acrylate monomer as a polymerizable compound, and
a treatment liquid including a divalent or higher-valent organic acid.

Particularly preferably, the particles of a self-dispersing polymer in the above combinations are particles of an acrylic resin containing structural units derived from a (meth)acrylate monomer.

Inkjet Recording Method

The inkjet recording method according to the present invention uses the aforementioned ink set of the present invention, and includes:
ink applying step of applying an ink composition to a recording medium by an inkjet method, wherein the ink composition includes a pigment, polymer particles including a polymer having an ethyleneoxide chain at a side chain, and a water-soluble polymerizable compound having an ethyleneoxide chain that undergoes polymerization when irradiated with an active energy radiation; and
a treatment-liquid applying step of applying a treatment liquid to the recording medium wherein the treatment liquid includes a coagulant that coagulates ingredients in the ink composition. The inkjet recording method of the present invention may include one or more other processes as necessary.

In the present invention, the ink composition for forming an ink image includes polymer particles and a water-soluble polymerizable compound that can be cured through polymerization, together with a pigment. Due to this configuration, an image is immobilized by a coagulation reaction of the pigment and/or the polymer particles when the ink composition contacts the treatment liquid. Further, the polymer particles are present between particles of the pigment, and the polymerizable compound, which is in the state of being incorporated into a space among such particles in the immobilized image, is cured through polymerization, whereby the strength of the final image is increased. In other words, using the treatment liquid, components in the ink composition are coagulated rapidly to prevent intermixing of ink droplets, such as bleeding or intercolor mixing, and, as a result, suitability for high-speed recording and effects in improving the hue and image printing properties (including reproducibility of thin lines and minute portions in an image) during high-speed recording are imparted, while the polymerizable compound enters, to an appropriate extent, into a space among the pigment particles and the polymer particles that are in a coagulated state. Since the polymerizable compound is cured through polymerization and in this state, the image strength can be improved, and both suitability for high-speed recording and improvement in the rubbing resistance of an image can be achieved. Also in the invention, based on the fact that both the polymer particles and the polymerizable compound have the ethylene oxide chain [$(C_2H_4O)_n$ chain; n represents a positive integer], the surface of images to be formed is prevented from becoming non-uniform, so that a highly-uniform image surface is obtained. Thus, images having excellent gloss of image portions (e.g., a region having a relatively large amount of ink such as a solid image or the like) can be formed.

In particular, these effects are more conspicuous when image recording is performed on a coated paper as a recording medium having a surface at which the pigment tends to remain.

As the polymer particles, self-dispersing polymer particles are preferable. Use of the self-dispersing particles further improves hue and image printing properties at the time of high-speed printing. The reason thereof is possibly as follow.

In the present invention, when a self-dispersing polymer is used as a component of the ink composition, the amount of the free emulsifying agent that is used to be incorporated when a liquid containing resin particles is prepared in conventional methods is reduced or eliminated, and direct interaction of coagulation components is facilitated, so that rapid coagulation of components in the ink composition is enabled. Bleeding and intercolor mixing caused by interference between ink droplets are prevented thereby, and an image having excellent hue and image printing properties (including reproducibility of thin lines and minute portions in the image) is obtained at a higher speed than done by the conventional methods.

In the following, the steps of the inkjet recording method of the present invention are described.

Ink Applying Step

In the ink applying step, an ink composition containing a pigment, polymer particles having an ethylene oxide chain in a side chain, and a water-soluble polymerizable compound having an ethylene oxide chain that undergoes polymerization when irradiated with an active energy radiation is applied to a recording medium by an inkjet method. In this step, the ink composition can be applied selectively to the recording medium, so that a desired visible image can be formed. The ink composition includes at least a pigment, polymer particles, and a water-soluble polymerizable compound, and details of the ink composition, such as details and preferred modes of the respective components, are as described above.

Specifically, the recording of an image using an inkjet method may be performed by ejecting a liquid composition onto a desired recording medium by application of energy, and the recording medium is, for example, a plain paper, a resin-coated paper, a paper for inkjet recording, a film, a paper for both inkjet recording and electrophotographic recording, cloth, glass, a metal, and ceramics, as described in JP-A Nos. 8-169172, 8-27693, 2-276670, 7-276789, 9-323475, 62-238783, 10-153989, 10-217473, 10-235995, 10-337947, 10-217597, and 10-337947. An inkjet recording method that is preferably applicable in the present invention is the method described in paragraphs [0093] to [0105] of JP-A No. 2003-306623.

The inkjet method is not particularly limited and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by radiation pressure generated by irradiation of ink with acoustic beams that have been converted from electric signals; and a thermal inkjet method in which ink is ejected by a pressure generated by formation of bubbles caused by heating of ink (BUBBLE-JET, registered trademark). An inkjet method is described in JP-A No. 54-59936 and can be suitably used; in this method, ink is ejected from a nozzle by an acting force generated by a rapid change in volume of the ink caused by application of a thermal energy to the ink.

Further, examples of the inkjet method include a method in which a large number of small-volume droplets of an ink having a low optical density, which is called a photo ink, are ejected; a method in which inks of substantially the same color hue at different densities are used to improve image quality; and a method in which a clear and colorless ink is used.

The inkjet head used in an inkjet method may be either an on-demand type head or a continuous type head. Specific examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system), and any of these ejection systems is applicable.

The ink nozzles used for the inkjet recording are not particularly limited, and may be appropriately selected according to applications.

Specific examples of the inkjet recording method include those described below.

(1) A method called electrostatic attraction system, in which a strong electric field is applied between a nozzle and an accelerating electrode disposed in front of the nozzle so as to successively jet ink droplets from the nozzle, print information signals are supplied to deflection electrodes while the ink droplets pass a gap between the deflection electrodes so that the ink droplets are jetted towards a recording medium, and the ink is fixed on the recording medium to record an image, or in which ink droplets are jetted from a nozzle towards a recording medium, without being deflected, according to print information signals and an image is thereby fixed on the recording medium (2) A method in which a pressure is applied to an ink liquid by a small-sized pump and an inkjet nozzle is mechanically vibrated using a crystal oscillator or the like, thereby forcibly jetting ink droplets from the nozzle. The ink droplets jetted from the nozzle is electrically charged simultaneously with the jetting, and print information signals are supplied to deflection electrodes while the ink droplets pass a gap between the deflection electrodes so as to jet the ink droplets towards a recording medium, and an image is thereby recorded on the recording medium.

(3) A piezo method, in which a pressure and print information signals are simultaneously applied to an ink liquid by a piezoelectric device, and as a result ink droplets are jetted from a nozzle towards a recording medium and an image is thereby recorded on the recording medium.

(4) A BUBBLE-JET (registered trademark) method, in which an ink liquid is heated and bubbled by a microelectrode according to print signal information, and the bubbles are allowed to expand so that the ink liquid is jetted from a nozzle towards a recording medium and an image is thereby recorded on the image recording medium.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned. As a result, a conveyance system, such as a carriage which moves the short head in a scanning manner is unnecessary. Further, since a complicated scan-movement control of the movement of the carriage and the recording medium is unnecessary and only the recording medium is moved, the recording speed can be increased when compared to the shuttle system. The inkjet recording method of the present invention can be applied to both of these systems; effects of improving both ejection accuracy and rubbing resistance of an image are larger when the inkjet recording method of the present invention is applied to a line system, in which dummy jetting is not generally performed.

The amount of ink per one drop ejected from an inkjet head is preferably from 1 pl to 10 pl (picoliter), and more preferably from 1.5 pl to 6 pl, from the viewpoint of obtaining a high-precision image. It is also effective to eject liquid droplets of different quantities in combination, with a view to suppressing unevenness in an image and improving smoothness in continuous gradation. The present invention is effective also in such an embodiment.

Treatment-Liquid Applying Step

In the treatment-liquid applying step, a treatment liquid containing a coagulant that coagulates ingredients in the ink composition is applied to a recording medium, and the treatment liquid is brought into contact with the ink composition, thereby forming an image. In this process, dispersed particles in the ink composition, such as the pigment and the polymer particles, are aggregated, whereby the image is immobilized onto the recording medium. The treatment liquid includes at least a coagulant, and details and preferred modes of the respective components are as described above.

Application of the treatment liquid can be performed using a known method, such as a coating method, an inkjet method, or an immersion method. The coating method may be a known coating method using a bar coater, an extrusion die coater, an air doctor coater, a blade coater, a rod coater, a knife coater, a squeeze coater, a reverse roll coater, or the like. Details of the inkjet method are as described above.

The treatment-liquid applying step may be performed before or after the ink applying step using the ink composition. In the present invention, it is preferable to perform the ink applying step after the treatment liquid is applied in the treatment-liquid applying step. Specifically, in a preferable embodiment, the treatment liquid for aggregating the pigment and/or the self-dispersing polymer particles in the ink composition is applied on the recording medium prior to applying the ink composition, and the ink composition is applied so as to contact with the treatment liquid provided on the recording medium, whereby an image is formed. As a result, inkjet recording can be performed at higher speed, and an image having high density and resolution is obtained even when recording is performed at high speed.

The amount of the treatment liquid to be applied is not particularly limited as long as the ink composition can be coagulated, and is preferably $0.1 \text{ g/m}^2$ or more in terms of the amount of applied coagulant. The amount of the applied coagulant is more preferably from 0.2 to $0.7 \text{ g/m}^2$. When the amount of the applied coagulant is $0.1 \text{ g/m}^2$ or more, superior high-speed coagulation properties that accord with various modes of the use of the inkjet composition are maintained. A coagulant application amount of $0.7 \text{ g/m}^2$ or less is preferable in that disadvantageous influences, such as change in gloss, are not given to the surface properties of the recording medium to which the treatment liquid is applied.

In the present invention, it is preferable that the ink applying step is performed after the treatment-liquid applying step and a heat-drying step of drying the treatment liquid on the recording medium by heating is performed during a period after the application of the treatment liquid onto a recording medium until the application of the ink composition. By drying the treatment liquid by heating prior to the ink applying step, the ink receiving properties, including suppression of bleeding, are improved, and a visible image having superior color density and hue can be recorded.

The drying by heating may be performed with a known heating means, such as a heater, or a heating means utilizing blowing of air, such as a drier, or a means having a combination thereof. Examples of the heating method include: a method of supplying heat from the side of the recording medium opposite to the surface on which the treatment liquid has been applied, using a heater or the like; a method of blowing a warm or hot air to the surface of the recording medium on which the treatment liquid has been applied; a heating method using an infrared heater; and a combination of two or more of the above methods.

Recording Medium

According to the image recording method of the present invention, an image is recorded on a recording medium.

The recording medium is not particularly limited, and may be a cellulose-based general printing paper, such as high-quality paper, coat paper, or art paper, which is used for general offset printing and the like. When image recording is performed on the cellulose-based general printing paper by a general inkjet method using an aqueous ink, absorption and drying of the ink is relatively slow. As a result, colorant migration easily occurs after ink spotting, and image quality tends to degrade. In contrast, according to the inkjet recording method of the present invention, a high-quality image recording having excellent color density and hue is achieved while suppressing the migration of the colorant.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and NEW NPI JO-SHITSU (trade name) manufactured by Nippon Paper Industries Co., Ltd.; very light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (trade name) manufactured by Nippon Paper Industries Co., Ltd.; and art papers (A1) such as 2/SIDE GOLDEN CASK GLOSS (trade name) manufactured by Oji Paper Co., Ltd. and TOKUBISHI ART (trade name) manufactured by Mitsubishi Paper Mills Ltd. As the recording medium, various inkjet-recording papers suitable for photos may be used.

Among the recording media, coated paper, which is used for general offset printing, is preferable. The coated paper is produced generally by coating a surface of cellulose-based paper (such as high-quality paper or neutral paper), which has not been subjected to surface treatment, with a coating material so as to form a coating layer. When image forming is performed by usual water-based inkjet, the coated paper tends to cause quality problems in terms of, for example, in image gloss or rubbing resistance. In contrast, according to the inkjet recording method of the present invention, unevenness in gloss is suppressed and an image having excellent gloss and rubbing resistance can be obtained even when the coated paper is used. In particular, it is preferable to use a coated paper having base paper and a coated layer including an inorganic pigment, and it is more preferable to use a coated paper having base paper and a coated layer including kaolin and/or calcium bicarbonate. Specifically, art paper, coat paper, lightweight coat paper, or very light-weight coat paper is preferable.

Inkjet Recording Apparatus

Next, an example of an inkjet recording apparatus favorably used for the image recording method of the present invention will be explained in detail with reference to FIG. 1. FIG. 1 is a schematic view showing an example of a structure of the entire inkjet recording apparatus.

As shown in FIG. 1, the inkjet recording apparatus includes: treatment liquid application unit 12, having treatment liquid ejection head 12S that jets the treatment liquid; treatment liquid drying zone 13, having heating unit (not shown) that dries the applied treatment liquid; and ink jetting unit 14 that jets various ink compositions; and ink drying zone 15 at which the jetted ink composition is dried, in this order in the conveyance direction of the recording medium (the direction of the arrow shown in the FIGURE).

Further, UV ray irradiation unit 16, having UV ray irradiation lamp 16S, is provided downstream of ink drying zone 15 in the conveyance direction of the recording medium.

The recording medium that has been supplied to the inkjet recording apparatus is conveyed by conveyance rollers from a feed section to treatment liquid application unit 12, then to treatment liquid drying zone 13, then to ink jetting unit 14, then to ink drying zone 15, and then to UV ray irradiation unit 16, and then accumulated in an accumulation section. The feed section feeds sheets of the recording medium from a case in which the sheets are loaded. The conveyance of the recording medium may be conducted by a method other than the method using conveyance rollers, and examples of the other method include a drum conveyance method using a drumshaped member, a belt conveyance method, or a stage conveyance method using a stage.

Among the plural conveyance rollers provided in the inkjet recording apparatus, at least one roller may be a drive roller to which the force generated by a motor (not shown) is transmitted. By rotating the drive roller at a constant rate using the motor, the recording medium is conveyed in a predetermined direction, at a predetermined conveyance amount.

Treatment liquid application unit 12 has treatment liquid jetting head 12S, which is connected to a storage tank in which the treatment liquid is stored. Treatment liquid jetting head 12S jets the treatment liquid from jetting nozzles disposed to face the recording surface of the recording medium so that droplets of the treatment liquid can be applied onto the recording medium. The method used in treatment liquid application unit 12 is not limited to a method of jetting from a head in the form of a nozzle, and may be a coating method using a coating roller. According to the coating method, the treatment liquid may be readily applied to almost the entire one surface of the recording medium, including an image portion on which ink droplets are to be spotted by ink jetting unit 14 provided at the downstream side. In order to make uniform the thickness of the treatment liquid applied onto the recording medium, an air-knife may be used, or a method of providing a member having an acute angle to give a gap between the member and the recording medium that corresponds to the predetermined amount of treatment liquid.

Treatment liquid drying zone 13 is positioned downstream of treatment liquid application unit 12 in the conveyance direction of the recording medium. Treatment liquid drying zone 13 may include a known heating means such as a heater; an air blower such as a drier; or a combination thereof. The heating may be conducted by a method of disposing a heat-generating member, such as a heater, at a side of the recording medium opposite to the surface applied with treatment liquid wherein, if the recording medium is conveyed automatically, the heat-generating member may be positioned, for example, below the conveyance system that conveys the recording medium placed thereon; or by a method of blowing warm or hot air onto the surface of the recording medium applied with treatment liquid; or by a method of using an infrared heater. Any of these methods may be used singly, or in combination of two or more thereof.

Since the surface temperature of the recording medium may vary depending on the type (material, thickness or the like) of the recording medium and the environmental temperature, it is preferable to dry the treatment liquid while regulating the surface temperature by using a system including a measurement section that measures the surface temperature of the recording medium and a control section that provides the heating control unit with feedback on the value of temperature measured by the measurement section. The measurement section for measuring the surface temperature of the recording medium is preferably a contact-type or non-contact type thermometer.

The solvent may be removed using, for example, a solvent-removing roller. Alternatively, a method in which excess solvent is removed from the recording medium by an air knife is also applicable.

Ink jetting unit 14 is positioned downstream of treatment liquid drying zone 13 with respect to the conveyance direction of the recording medium. Ink jetting unit 14 includes recording heads (ink jetting heads) 30K, 30C, 30M and 30Y, which are connected to ink reservoirs that store inks of black (K), cyan (C), magenta (M) and yellow (Y), respectively. Each ink reservoir (not shown) stores an ink composition containing a pigment of a corresponding color, resin particles, water-soluble organic solvent and water, and supplies the ink to the corresponding head among ink jetting heads 30K, 30C, 30M and 30Y, as necessary, when image recording is performed. Further, as shown in FIG. 1, recording heads 30A and 30B for jetting inks of specific colors may be further provided, which are positioned downstream of ink jetting heads 30K, 30C, 30M and 30Y with respect to the conveyance direction of the recording medium, such that recording heads 30A and 30B jet the inks having specific colors as necessary.

Ink jetting heads 30K, 30C, 30M and 30Y jet inks in a manner corresponding to the image to be formed, through jetting nozzles that are positioned so as to face the recording surface of the recording medium. In this way, inks of the respective colors are applied to the recording surface of the recording medium to form a color image.

Treatment liquid jetting head 12S and ink jetting heads 30K, 30C, 30M, 30Y, 30A and 30B are each in the form of full-line head in which a number of jetting ports (nozzles) are aligned along the maximum recording width of the image to be formed on the recording medium. In this form, image recording on a recording medium can be carried out at higher speed compared to serial-type recording in which recording is carried out using a short-length shuttle head that reciprocates in the width direction of the recording medium (in a direction on the plane of the recording medium that is perpendicular to the conveyance direction of the recording medium) in a scanning manner. In the present invention, either of above serial-type recording method or a recording method capable of recording at relatively high speed, such as a single-path system in which an image is formed in one scanning-movement by jetting using a line head while moving the recording medium relative to the line head in the fast scanning direction, may be employed. In the image recording method of the present invention, a high-quality image having high reproducibility may be obtained even in the single-path system.

In the FIGURE, treatment liquid jetting head 12S and ink jetting heads 30K, 30C, 30M, 30Y, 30A and 30B have the same structure.

The application amount of the treatment liquid and the application amount of the ink composition are preferably regulated in accordance with the necessity. For example, the amount of the treatment liquid may be changed according to the type of the recording medium, in order to, for example, adjust the properties such as viscoelasticity of the aggregates formed by mixing of the treatment liquid and the ink composition.

Ink drying zone 15 is positioned downstream of ink jetting unit 14 in the conveyance direction of the recording medium. Ink drying zone 15 may have a structure similar to that of treatment liquid drying zone 13.

UV ray irradiation unit 16 is disposed further downstream of ink drying zone 15 in the conveyance direction of the recording medium, and emits UV ray from UV ray irradiation lamp 16S provided in UV ray irradiation unit 16, thereby curing through polymerization of the monomer components contained in an image after drying of the image. UV ray irradiation lamp 16S is a lamp which is disposed to oppose the recording surface of the recording medium, and with which the entire recording surface is irradiated to cure the entire image. The lamp used in UV ray irradiation unit 16 is not limited to UV ray irradiation lamp 16S, and it is also possible to use a halogen lamp, a high-pressure mercury lamp, a laser, a LED, an electron-beam irradiation device, or the like.

The UV ray irradiation unit 16 may be disposed before or after the ink drying zone 15 and may be disposed both before and after the ink drying zone 15.

The inkjet recording apparatus may further include a heating unit at the conveyance path from the feed section to the accumulation section, in order to conduct a heat treatment on the recording medium. For example, by providing a heating unit at a desired position, such as upstream of treatment liquid drying zone 13 or between ink jetting unit 14 and ink drying zone 15, the temperature of the recording medium can be increased to a desired temperature, at which drying and fixing is performed effectively.

Hereinafter, various aspects of an ink set of the present invention and an image forming method using the same are exemplified.

<1> An ink set, contains an ink composition containing a pigment, polymer particles having an ethylene oxide chain [$(C_2H_4O)_n$ chain (n represents a positive integer; hereinafter also referred to as an EO chain, which applies below), a structural unit derived from polyethylene glycol] in a side chain, and a water-soluble polymerizable compound that has an ethylene oxide chain [$(C_2H_4O)_n$ chain (n=positive integer); EO chain] and is polymerized by active energy rays, and a treating liquid containing an aggregating agent that aggregates ingredients in the ink composition.

<2> The ink set according to <1> above, in which a proportion of the ethylene oxide chain in the polymer particles is 1 to 15% by mass relative to a total mass of the polymer.

<3> The ink set according to <1> or <2> above, in which the pigment is a water-dispersible pigment, at least one portion of a surface of which is covered with a polymer dispersing agent.

<4> The ink set according to <3> above, in which the polymer dispersing agent has a carboxyl group.

<5> The ink set according to any one of <1> to <4> above, in which the aggregating agent is an organic acid.

<6> The ink set according to any one of <1> to <5> above, in which the aggregating agent is a divalent or higher-valent organic acid.

<7> The ink set according to any one of <3> to <6> above, in which the polymer dispersing agent has an acid value of 130 mgKOH/g or lower.

<8> The ink set according to any one of <1> to <7> above, in which the polymer particles are self-dispersing polymer particles having an acid value of 70 mgKOH/g or lower.

<9> The ink set according to any one of <1> to <8> above, in which the polymerizable compound is a nonionic compound.

<10> The ink set according to any one of <1> to <9> above, in which at least one of the ink composition or the treatment liquid further contains an initiator that initiates polymerization of the polymerizable compound with active energy rays.

<11> An image forming method, including an ink applying process for applying an ink composition containing a pigment, polymer particles having an ethylene oxide chain in a side chain of the polymer, and a water-soluble polymerizable compound that has an ethylene oxide chain and that is polymerized with active energy rays, to a recording medium by an inkjet method, and a treatment liquid applying process for applying a treatment liquid containing an aggregating agent that aggregates ingredients in the ink composition, to the recording medium.

<12> The image forming method according to <11> above, in which a proportion of the ethylene oxide chain in the polymer particles is from 1 to 15% by mass relative to a total mass of the polymer.

<13> The image forming method according to <11> or <12> above, in which the recording medium is a coated paper containing a base paper and a coat layer containing an inorganic pigment.

EXAMPLES

In the following, the present invention will be described in further details with reference to the examples. However, the present invention is not limited to these examples as long as the gist of the invention is retained. Moreover, the term "part" refers to "part by mass" unless otherwise indicated.

Preparation of Aqueous Ink
Preparation of Cyan Ink C1-1
Preparation of Cyan Dispersion Liquid 6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercapto ethanol, and 24 parts of methyl ethyl ketone were added into a reaction vessel to prepare a mixed solution.

Separately, 14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were added into a dripping funnel to prepare a mixed solution.

In a nitrogen atmosphere, the mixed solution in the reaction vessel was heated to 75° C. while stirring, and the mixed solution in the dripping funnel was gradually dripped into the reaction vessel over one hour. Two hours after the completion of the dripping, 12 parts of methyl ethyl ketone in which 1.2 parts of 2,2'-azobis(2,4-dimethylvaleronitrile) was dissolved was dripped into the reaction vessel over three hours. The mixed solution was further aged at 75° C. for two hours and then at 80° C. for two hours, thereby obtaining a polymer dispersant solution.

The weight average molecular weight of the polymer in the obtained polymer dispersant solution was measured in the following manner. A part of the polymer dispersant solution was isolated by removing the solvent, and the obtained solid content was diluted with tetrahydrofuran to 0.1 mass % to obtain a sample. The sample was subjected to high-speed GPC (gel permeation chromatography) using HLC-8220 GPC (columns: TSKGEL Super HZM-H, TSKGEL Super HZ4000, and TSKGEL Super HZ2000 (manufactured by Tosoh Corporation) connected in tandem). The weight average molecular weight of the polymer as measured was 25,000 (as a polystyrene-equivalent value), and the acid value of the polymer was found to be 80 mgKOH/g.

Next, 5.0 g (in terms of solid content) of the obtained polymer dispersant solution, 10.0 g of a cyan pigment (Pigment Blue 15:3, manufactured by Dainichiseika Color & Chemicals Mfg. Co., Ltd.), 40.0 g of methyl ethyl ketone, 8.0 g of 1 mol/L (liter) sodium hydroxide, and 82.0 g of ion exchange water were put in a vessel together with 300 g of 0.1 mm zirconia beads, and were dispersed for 6 hours at 1,000 rpm with a disperser READY MILL (trade name, manufactured by Aimex Co., Ltd.). The resulting dispersion liquid was condensed under reduced pressure using an evaporator until methyl ethyl ketone was sufficiently removed, and the dispersion liquid was further condensed until the concentration of pigment reached 10%. Cyan pigment dispersion liquid C1 was thus obtained, in which the water-dispersible pigment was dispersed.

The volume average particle diameter (of the secondary particles) of the cyan dispersion liquid C1 as measured by a dynamic light scattering method using a particle size distribution meter MICROTRAC Version 10.1.2-211 BH (trade name, manufactured by Nikkiso Co., Ltd.) was 77 nm.

Synthesis of Fine Particles of Self-dispersing Polymer 360.0 g of methyl ethyl ketone was placed in a 2 L three-necked flask equipped with a stirrer, a thermometer, a reflux condenser, and a nitrogen gas introduction tube, and was heated to 75° C. Thereafter, while the temperature inside the flask was maintained at 75° C., a mixture solution of 252.0 g of methyl methacrylate, 54.0 g of benzyl acrylate, 36.0 g of phenoxyethyl acrylate, 18.0 g of acrylic acid, 72 g of methyl ethyl ketone, and 1.44 g of V-601 (trade name, manufactured by Wako Pure Chemical Industries Ltd.) was added dropwise into the flask at a constant rate such that the dropwise addition was completed in 2 hours. After the dropwise addition was completed, a solution of 0.72 g of V-601 in 36.0 g of methyl ethyl ketone was added into the flask, stirred at 75° C. for 2 hours, and a solution of 0.72 g of V-601 in 36.0 g of isopropanol was further added, and the contents of the flask were stirred at 75° C. for 2 hours. Then, the temperature inside the flask was increased to 85° C., and stirring was continued for another 2 hours. As a result, a resin solution of a copolymer of methyl methacrylate/benzyl acrylate/phenoxyethyl acrylate/acrylic acid (in a ratio of 70/15/10/5 by mass) was obtained.

The weight average molecular weight (Mw) of the obtained copolymer as measured in a similar manner to the above was 64,000 (calculated as polystyrene-equivalent value according to gel permeation chromatography (GPC)). The acid value of the copolymer was found to be 38.9 mgKOH/g.

The weight average molecular weight was measured using a high-speed GPC (gel permission chromatography) HLC-8220 (trade name) with three columns of TSKGEL SUPER HZM-H, SUPER HZ4000, and TSKGEL SUPER HZ2000 (each trade name, manufactured by Tosoh Corporation) connected in tandem.

Then, 668.3 g of the obtained resin solution was weighed, and 388.3 g of isopropanol and 145.7 ml of a 1 mol/L NaOH aqueous solution were added to the resin solution, and then the temperature inside the reaction vessel was elevated to 80° C. Thereafter, 720.1 g of distilled water was added dropwise into the reaction vessel at a rate of 20 ml/min so as to form a water dispersion. The contents of the reaction vessel was allowed to stand, under atmospheric pressure, at a reaction vessel inside temperature of 80° C. for 2 hours, and then 85° C. for 2 hours, and then 90° C. for 2 hours. Subsequently, the pressure inside the reaction vessel was reduced, and the isopropanol, the methyl ethyl ketone, and the distilled water were removed in a total amount of 913.7 g. As a result, a water dispersion of self-dispersing polymer fine particles B-1 having a solid concentration of 28.0% by mass was obtained.

The volume average particle size of the self-dispersing polymer particles B-1 in the water dispersion was 40 nm when measured by a dynamic light scattering method using a nano track particle size distribution meter UPA-EX150 (trade name, manufactured by Nikkiso Co., Ltd.).

Preparation of Cyan Ink C-1

After the cyan dispersion liquid C1 was prepared as described above, the cyan dispersion liquid C1 was mixed with the water dispersion of self-dispersing polymer fine particles B-1, an organic solvent, a surfactant, and ion-exchange water, so that an ink having the following composition was prepared. After the preparation of the ink, the ink was filtered through a 5 μm filter so as to remove coarse particles, whereby a cyan ink was obtained.

Composition of Cyan Ink C-1

| | |
|---|---|
| Cyan pigment | 3% by mass |
| (PIGMENT BLUE 15:3, trade name, manufactured by Dainichiseika Colour & Chemicals Mfg. Co., Ltd.) | |
| Polymer dispersing agent solution (solid content) | 1.5% by mass |
| Water dispersion of self-dispersible polymer particles B-1 (solid content) | 5% by mass |
| NK ESTER A-400 | 12% by mass |
| (trade name, Polyethylene glycols #400 diacrylate, manufactured by Shin-Nakamura Chemical Co., Ltd.) | |
| SANNIX GP250 | 5% by mass |
| (trade name, manufactured by Sanyo Chemical Industries, Ltd.; hydrophilic organic solvent) | |
| OLFINE E1010 | 1% by mass |
| (trade name, manufactured by Nisshin Chemical Co., Ltd.; nonionic surfactant) | |
| IRGACURE 2959 | 1.8% by mass |
| (trade name, manufactured by Ciba Specialty Chemicals; photoinitiator) | |
| Ion exchanged water | 70.7% by mass |

Preparation of Cyan Inks C-2 to C-6

Cyan inks C-2 to C-6 were prepared in the same manner as in the cyan ink C-1, except for changing the self-dispersing polymer particles B-1 to the following self-dispersing polymer particles B-2 to B-6 in the preparation of the cyan ink C-1.

Synthesis of Self-Dispersing Polymer Particles B-2 to B-6

Self-dispersing polymer particles B-2 to B-5 were synthesized in the same manner as in the self-dispersing polymer particles B-1, except for changing the monomer used for the synthesis of the self-dispersing polymer particles B-1 to the compositions shown in Table 1. The volume average particle size of the self-dispersing polymer particles B-2 to B-6 was measured by the same method as that of the self-dispersing polymer particles B-1. The measurement results are shown in Table 1.

TABLE 1

| | Monomer type | Monomer mass ratio | Mass proportion of EO unit | Volume average particle size |
|---|---|---|---|---|
| B-1 | MMA/BzA/PhOEA/AA | 252/54/36/18 | 0% | 40 nm |
| B-2 | MMA/BzA/PMA-1000/MAA | 270/54/18/18 | 4.60% | 35 nm |
| B-3 | MMA/BzA/PMA-1000/MAA | 252/54/36/18 | 9.10% | 48 nm |
| B-4 | MMA/BzA/PMA-400/MAA | 252/54/36/18 | 8.00% | 20 nm |
| B-5 | MMA/BzA/PMA-100/MAA | 252/54/36/18 | 4.70% | 30 nm |
| B-6 | MMA/BzA/PMA-1000/MAA | 279/54/9/18 | 2.30% | 32 nm |

The details of the monomers in Table 1 are as follows.
MMA: Methylmethacrylate
BzA: Benzyl acrylate
PhOEA: Phenoxyethyl acrylate
AA: Acrylic acid
MAA: Methacrylic acid
PMA-1000: Methoxy polyethylene glycol mono-methacrylate (Number of ethylene oxide chains = 23; trade name, manufactured by NOF Corporation)
PMA-400: Methoxy polyethylene glycol mono-methacrylate (Number of ethylene oxide chains = 9; trade name, manufactured by NOF Corporation)
PMA-100: Methoxy polyethylene glycol mono-methacrylate (Number of ethylene oxide chains = 2; trade name, manufactured by NOF Corporation)

Preparation of Cyan Ink C-7: for Comparison

A cyan ink was prepared using ingredients in such a manner as to have the following composition. After preparation, the obtained ink was passed through a 5 μm filter to remove coarse particles, thereby obtaining a cyan ink.

Composition of Cyan Ink C-7

| | |
|---|---|
| Cyan pigment<br>(PIGMENT BLUE 15:3, trade name, manufactured by<br>Dainichiseika Colour & Chemicals Mfg. Co., Ltd.) | 3% by mass |
| Polymer dispersing agent solution described above<br>(solid content) | 1.5% by mass |
| Water dispersion of self-dispersing polymer particulates<br>B-2 (solid content) | 5% by mass |
| SANNIX GP250<br>(trade name, manufactured by Sanyo Chemical<br>Industries, Ltd.; hydrophilic organic solvent) | 17% by mass |
| OLFINE E1010<br>(trade name, manufactured by Nisshin<br>Chemical Co., Ltd.) | 1% by mass |
| IRGACURE 2959<br>(trade name, manufactured by Ciba Specialty<br>Chemicals; photoinitiator) | 1.5% by mass |
| Ion exchanged water | 73% by mass |

Preparation of Magenta Ink Yellow Ink-Black Ink

A magenta ink M-1, yellow inks Y-1 to Y-2, and a black ink B1-1 were prepared in the same manner as in the cyan ink C-2, except for changing the pigment to the pigments shown in Table 2 in the preparation of the cyan ink C-2.

TABLE 2

| | Pigment |
|---|---|
| M-1 | PR-122 |
| Y-1 | PY-74 |
| Y-2 | Pig.-1 |
| Bl-1 | Carbon black |

The details of the pigments in Table 2 are as follows.
PR-122: Pigment Red 122
PY-74: Pigment Yellow 74
Carbon black (#2600, manufactured by Mitsubishi Chemical Corporation)
Pig-1 shown below: Azo pigment represented by Formula (1) previously described above

Synthesis Example of Pig.-1

The synthesis scheme of Exemplified Compound Pig.-1 is shown below.

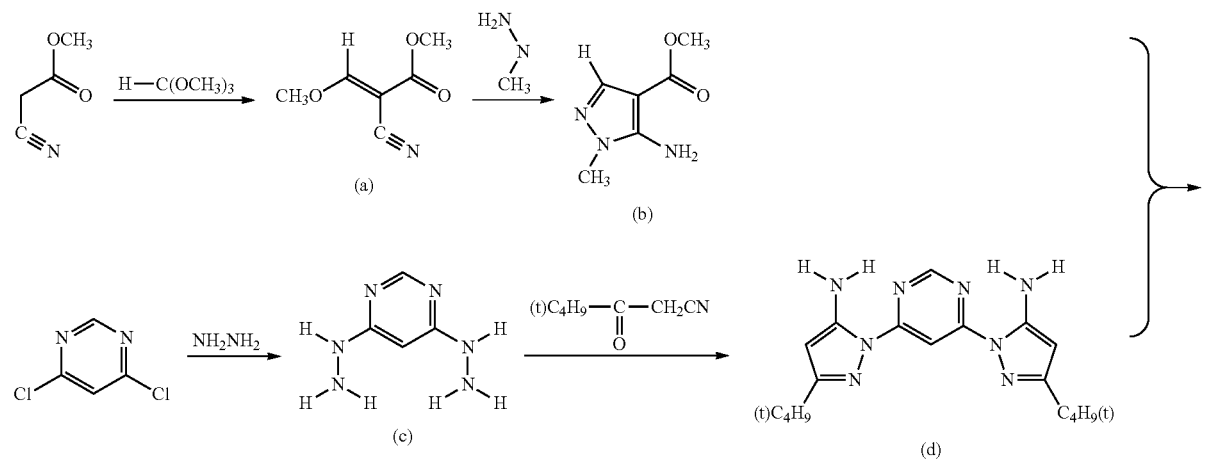

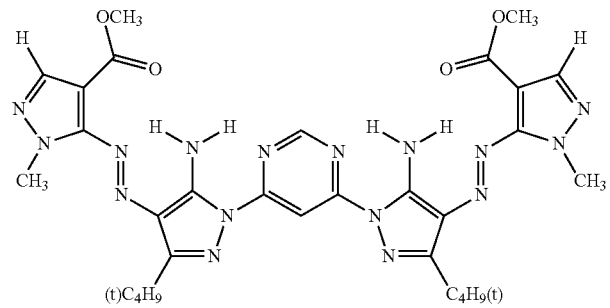

Pig.-1

(1) Synthesis of Intermediate (a)

42.4 g (0.4 mol) of trimethyl orthoformate, 20.4 g (0.2 mol) of acetic anhydride, and 0.5 g of p-toluenesulfonic acid were added to 29.7 g (0.3 mol) of methyl cyanoacetate to prepare a mixture. The mixture was heated to 110° C. (outer temperature), and stirred for 20 hours while distilling off low boiling point ingredients produced from the reaction system. The resultant reaction liquid was concentrated under reduced pressure, and subjected to silica gel column purification, thereby obtaining 14.1 g of the intermediate (a) (yellow powder, yield of 30%). The NMR measurement results of the obtained intermediate (a) are as follows.

$^1$H-NMR (300 MHz, CDCl$_3$) 7.96 (s, 1H), 4.15 (s, 3H), 3.81 (s, 3H)

(2) Synthesis of Intermediate (b)

150 mL of isopropanol was added to 7.4 mL (141 mmol) of methyl hydrazine to prepare a mixture. The mixture was cooled to 15° C. (internal temperature), 7.0 g (49.6 mmol) of the intermediate (a) was gradually added to the mixed liquid, and the mixture was heated to 50° C. and stirred for 1 hour and 40 minutes. The reaction liquid was concentrated under reduced pressure, and subjected to silica gel column purification, thereby obtaining 10.5 g (white powder, yield of 50%) of the intermediate (b). The NMR measurement results of the obtained intermediate (b) are as follows.

$^1$H-NMR (300 MHz, CDCl$_3$) 7.60 (s, 1H), 4.95 (brs, 2H), 3.80 (s, 3H), 3.60 (s, 3H)

(3) Synthesis of Intermediate (c)

100 mL of methanol was added to 130 mL of hydrazine hydrate to prepare a mixture. The mixture was cooled to 10° C. (internal temperature), and then 50.0 g (336 mmol) of 4,6-dichloropyrimidine was gradually added to the mixed liquid (internal temperature of 20° C. or lower), and then the mixture was heated to 50° C. and stirred for 4 hours and 30 minutes. The crystals deposited from the reaction liquid were collected by filtration, washed with isopropanol, and dried, thereby obtaining 43.1 g of the intermediate (c) (white powder, yield of 92%). The NMR measurement results of the obtained intermediate (c) are as follows.

$^1$H-NMR (300 MHz, d$_6$-DMSO) 7.82 (s, 1H), 7.55 (s, 2H), 5.96 (s, 1H), 4.12 (s, 4H)

(4) Synthesis of Intermediate (d)

900 mL of water was added to 35.0 g (0.25 mol) of the intermediate (c) and 68.8 g (0.55 mol) of pivaloyl acetonitrile to prepare a suspension. The suspension was stirred at room temperature. 1 M aqueous hydrochloric acid was added dropwise to the suspension in such a manner as to adjust the pH to 3, and then the mixture was heated to 50° C. and stirred for 8 hours. To the resultant reaction liquid, an 8M potassium hydroxide aqueous solution was added dropwise to adjust the pH to 8, and 1M aqueous hydrochloric acid was further added dropwise to adjust the pH to 6. The deposited crystals were collected by filtration, washed with isopropanol, and dried, thereby obtaining 83.0 g of the intermediate (d) (white powder, yield 94%). The NMR measurement results of the obtained intermediate (d) are as follows.

$^1$H-NMR (300 MHz, d$_6$-DMSO) 8.73 (s, 1H), 7.97 (s, 1H), 6.88 (s, 4H), 5.35 (s, 2H), 1.22 (s, 18H)

(5) Synthesis of Exemplified Compound Pig.-1

18.5 mL of acetic acid was added to 4.1 mL of concentrated sulfuric acid to prepare a mixture. The mixture was stirred under ice cooling, and 3.85 g (12.1 mmol) of 40% nitrosylsulfuric acid was added dropwise. To the mixed liquid, 1.71 g (11.0 mmol) of the intermediate (b) was gradually added (internal temperature of 0° C. or lower), and the mixture was stirred at 0° C. for 2 hours. To the reaction liquid, 150 mg of urea was added, and the mixture was further stirred at 0° C. for 15 minutes, thereby preparing a diazo liquid A.

To the intermediate (d), 50 mL of methanol was added, and heated and dissolved. Then, the diazo liquid A was slowly added dropwise to the mixed liquid stirred under ice cooling (internal temperature of 10° C. or lower). The reaction liquid was stirred at room temperature for 2 hours. Then, the deposited crystals were collected by filtration, and washed with methanol, thereby obtaining crude crystals of the Exemplified Compound (Pig.-1). Further, water was added to the crude crystals, and stirred to prepare a suspension. Then, the pH of the suspension was adjusted to 7 with an aqueous sodium hydroxide solution, and then 20 mL of dimethyl acetamide was further added, and the resultant mixture was stirred at 80° C. for 2 hours. The deposited crystals were collected by filtration, and further suspended and washed in methanol. The obtained crystals were collected by filtration, and dried, thereby obtaining 2.0 g of the Exemplified Compound Pig.-1 (yellow powder, yield of 79%).

Preparation of Aqueous Treating Liquid

The ingredients in the following composition were mixed, thereby preparing a treatment liquid B-1. The viscosity, surface tension and pH (25±1° C.) of the treatment liquid B-1 when measured in the same manner as above were as follows: viscosity of 2.5 mPa·s, surface tension of 40 mN/m, and pH of 1.0.

Composition of Treatment Liquid B-1

| | |
|---|---|
| Malonic acid (a product manufactured by Wako Pure Chemical Industries, Ltd.) | 25% by mass |
| Diethylene glycol monomethyl ether (a product manufactured by Wako Pure Chemical Ind. Ltd.) | 20.0% by mass |
| EMULGEN P109 (trade name, manufactured by Kao Corp. nonionic surfactant) | 1.0% by mass |
| Ion exchanged water | 54% by mass |

Image Recording and Evaluation

The inks and the aqueous treatment liquids were used in the combinations described in Table 3 below, and images were recorded as described below. The recorded images were evaluated with respect to rubbing resistance and gloss property according to the below-described method. The evaluation results are as shown in Table 3 below.

Image Recording

First, an inkjet apparatus was prepared which has, as shown in FIG. 1, treatment liquid application unit 12 equipped with treatment liquid jetting head 12S that jets an aqueous treatment liquid, treatment liquid drying zone 13 that dries the applied aqueous treatment liquid, ink jetting unit 14 that jets various ink compositions, ink drying zone 15 that dries the applied ink composition, and ultraviolet ray (UV) irradiation unit 16 equipped with UV irradiation lamp 16S capable of irradiating UV are provided sequentially in the conveyance direction of the recording medium (the direction of the arrow shown in the FIGURE).

Although not shown in the FIGURE, treatment liquid drying zone 13 has an air blower at the recording surface side of the recording medium that supplies dry air so as to dry the treatment liquid, and an infrared heater at the non-recording surface side of the recording medium. Treatment liquid drying zone 13 is configured such that at least 70% by mass of the water contained in the aqueous treatment liquid is evaporated (dried) off during a period until 900 msec has passed after the application of the treatment liquid is started at the treatment liquid application unit, by regulating the temperature and air volume. In ink jetting unit 14, black-ink jetting head 30K, cyan-ink jetting head 30C, magenta-ink jetting head 30M, and yellow-ink jetting head 30Y are disposed in this order in the conveyance direction (the direction of the arrow). Each of the heads is a 1200 dpi/10 inch-wide full-line head having a driving frequency of 25 kHz and a recording medium conveyance velocity of 530 mm/sec. The respective heads are configured to jet inks of respective colors in a single-pass manner while moving in the fast scanning direction relative to the recording medium.

The treatment liquid and ink prepared above were charged into storage tanks (not shown in the FIGURE) respectively connected to treatment jetting head 12S and cyan ink jetting head 30C of the inkjet apparatus that was configured as shown in FIG. 1, and a solid image and a 1200 dpi line image were recorded on sheets of a recording medium. The amount of the aqueous treatment liquid applied to each sheet of the recording medium was set to be 5 ml/m². As the recording medium, TOKUBISHI ART N (having a basis weight of 104.7 g/m², (trade name, manufactured by Mitsubishi Paper Mills Ltd.) and XEROX 4024 (trade name, manufactured by Fuji Xerox Co, Ltd.) were used.

During the image recording, the aqueous treatment liquid and the cyan ink were jetted at a resolution of 1200 dpi×600 dpi and an ink amount per droplet of 3.5 pl. The line image was recorded by jetting in a single-pass manner so as to form a line of 1200 dpi having a thickness of 1 dot, a line of 1200 dpi having a thickness of 2 dots, and a line of 1200 dpi having a thickness of 4 dots along the fast scanning direction. Regarding the formation of the solid image, a sheet of the recording medium was cut into a A5-size, and a solid image was formed by jetting the ink onto the entire one surface of the sample.

When the images were recorded, the treatment liquid was jetted from treatment liquid jetting head 12S onto the recording medium in a single-pass manner, and then the treatment liquid was dried in treatment liquid drying zone 13. Conveyance of the recording medium was controlled so as to pass through the treatment liquid drying zone within 900 msec after the initiation of the jetting of the aqueous treatment liquid. In treatment liquid drying zone 13, while the spotted aqueous treatment liquid was heated with an infrared heater from the side (back side) of the recording medium that was opposite to the surface at which the treatment liquid was spotted such that a film surface temperature was maintained at 40 to 45° C., hot air having a temperature of 120° C. was blown from a blower to the recording surface, and the air volume was changed to achieve a desired drying amount. Subsequently, the cyan ink was jetted from cyan ink jetting head 30C in a single pass manner to record an image. Then, in a manner similar to the above, drying of the ink was performed in ink drying zone 15 by blowing a hot air having a temperature of 120° C. and a velocity of 5 m/sec from a blower to the recording surface for 15 seconds while heating with an infrared heater from the side (back side) of the recording medium that was opposite to the surface side at which the ink was spotted. After the drying of the image, the image was irradiated with UV rays in UV ray irradiation unit 16, whereby the image was cured.

Evaluation

1. Glossiness

Solid images (sample) of the maximum ejection amount formed by combining each ink and the aqueous treatment liquid were output onto TOKUBISHI ART N (trade name) as described above, and allowed to stand under the environment of 25° C. and 50% RH for 1 hour. Then, glossiness of the sample surface was measured by a gross checker IG-331 (trade name, manufactured by HORIBA).

2. Rubbing Resistance

The A5-sized sample having the solid image formed on the entire one surface thereof was left to stand in an environment of 25° C. and 50% RH for 72 hours. Then a sheet of U-LITE (trade name, manufactured by Nippon Paper Industries Co., Ltd.) that has not undergone recording (hereinafter referred to as unused sample in the present evaluation) was placed over the solid image surface of the sample after the standing, and the solid image surface was rubbed ten strokes with a load of 200 kg/m². Thereafter, the unused sample and the solid image were visually observed and evaluated according to the following criteria. The evaluation results are shown in Table 1 below.

<Evaluation Criteria>

1. The color did not transfer onto the unused sample, and deterioration in the rubbed solid image was not observed, either.
2. Although the color transferred to the unused sample, deterioration in the rubbed solid image was not observed.
3. The color transferred to the unused sample, and deterioration in the rubbed solid image was observed.
4. A part of the rubbed solid image was erased, and the base paper of U-LITE (trade name) was exposed.

TABLE 3

| Ink | Polymer particles | Proportion of EO unit in polymer particles | Polymerizable compound | Rubbing resistance | Glossiness | Remarks |
| --- | --- | --- | --- | --- | --- | --- |
| C-1 | B-1 | 0% | A-400 | 1 | 32 | Comp. Ex. |
| C-2 | B-2 | 4.60% | A-400 | 2 | 48 | Present intention |
| C-3 | B-3 | 9.10% | A-400 | 1 | 58 | Present intention |
| C-4 | B-4 | 8.00% | A-400 | 1 | 57 | Present intention |
| C-5 | B-5 | 4.70% | A-400 | 1 | 52 | Present intention |
| C-6 | B-6 | 2.30% | A-400 | 2 | 49 | Present intention |
| C-7 | B-2 | 4.60% | None | 4 | 52 | Comp. Ex. |
| M-1 | B-2 | 9.10% | A-400 | 1 | 45 | Present intention |
| Y-1 | B-2 | 9.10% | A-400 | 2 | 48 | Present intention |
| Y-2 | B-2 | 9.10% | A-400 | 1 | 52 | Present intention |
| Bl-1 | B-2 | 9.10% | A-400 | 1 | 48 | Present intention |

As shown in Table 3, in the Examples, the rubbing resistance was excellent and a reduction in the glossiness was suppressed. In contrast, in Comparative Example, good rubbing resistance and favorable glossiness in combination were not achieved, which was problematic in terms of practical use.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set comprising:
   an ink composition comprising a pigment, polymer particles comprising a polymer having an ethylene oxide chain in a side chain of the polymer, and a water-soluble polymerizable compound that has an ethylene oxide chain and that is polymerized by active energy rays; and
   a treating liquid comprising an aggregating agent that aggregates ingredients in the ink composition.

2. The ink set according to claim 1, wherein a proportion of the ethylene oxide chain in the polymer particles is from 1% by mass to 15% by mass relative to a total mass of the polymer.

3. The ink set according to claim 1, wherein the pigment is a water-dispersible pigment, at least one portion of a surface of which is covered with a polymer dispersing agent.

4. The ink set according to claim 3, wherein the polymer dispersing agent has a carboxyl group.

5. The ink set according to claim 1, wherein the aggregating agent is an organic acid.

6. The ink set according to claim 1, wherein the aggregating agent is a divalent or higher-valent organic acid.

7. The ink set according to claim 3, wherein the polymer dispersing agent has an acid value of 130 mgKOH/g or lower.

8. The ink set according to claim 1, wherein the polymer particles are self-dispersing polymer particles having an acid value of 70 mgKOH/g or lower.

9. The ink set according to claim 1, wherein the polymerizable compound is a nonionic compound.

10. The ink set according to claim 1, wherein at least one of the ink composition or the treatment liquid further contains an initiator that initiates polymerization of the polymerizable compound with active energy rays.

11. An image forming method comprising:
    applying an ink composition comprising a pigment, polymer particles comprising a polymer having an ethylene oxide chain in a side chain of the polymer, and a water-soluble polymerizable compound that has an ethylene oxide chain and that is polymerized with active energy rays, to a recording medium by an inkjet method; and
    applying a treatment liquid comprising an aggregating agent that aggregates ingredients in the ink composition, to the recording medium.

12. The image forming method according to claim 11, wherein a proportion of the ethylene oxide chain in the polymer particles is from 1% by mass to 15% by mass relative to a total mass of the polymer.

13. The image forming method according to claim 11, wherein the recording medium is a coated paper comprising a base paper and a coat layer comprising an inorganic pigment.

* * * * *